July 20, 1965 L. P. HORWITZ ETAL 3,196,394

SPECIMEN IDENTIFICATION TECHNIQUES EMPLOYING NON-LINEAR FUNCTIONS OF AUTOCORRELATION FUNCTIONS

Filed March 3. 1961 24 Sheets-Sheet 1

INVENTORS
LAWRENCE P. HORWITZ
GLENMORE L. SHELTON, JR.

BY Francis J. Thomas
ATTORNEY

REFERENCE PATTERNS

TEST PATTERNS (GROUP 1)

TEST PATTERNS (GROUP 2)

TEST PATTERNS (GROUP 3)

FIG. 14

CORRELATION TABLE

| | SPECIMEN | D(x',y') COMPARISON | | | V(x',y') COMPARISON | | | V*(x',y') COMPARISON | | |
|---|---|---|---|---|---|---|---|---|---|---|
| | | TO REF. A | TO REF. B | TO REF. R | TO REF. A | TO REF. B | TO REF. R | TO REF. A | TO REF. B | TO REF. R |
| IDEAL | A | 1.000 | 0.930 | 0.931 | 1.000 | 0.493 | 0.525 | 1.000 | 0.044 | 0.079 |
| | B | 0.930 | 1.000 | 0.982 | 0.493 | 1.000 | 0.700 | 0.044 | 1.000 | 0.323 |
| | R | 0.931 | 0.982 | 1.000 | 0.525 | 0.700 | 1.000 | 0.079 | 0.323 | 1.000 |
| TEST PATTERNS GROUP 1 | A | 0.965 | 0.940 | 0.948 | 0.620 | 0.388 | 0.424 | 0.190 | −0.025 | −0.024 |
| | B | 0.919 | 0.973 | 0.969 | 0.415 | 0.643 | 0.510 | −0.030 | 0.251 | 0.112 |
| | R | 0.915 | 0.959 | 0.978 | 0.441 | 0.482 | 0.648 | 0.002 | 0.098 | 0.233 |
| TEST PATTERNS GROUP 2 | A | 0.885 | 0.905 | 0.916 | 0.430 | 0.351 | 0.363 | 0.069 | −0.011 | −0.023 |
| | B | 0.868 | 0.916 | 0.923 | 0.355 | 0.449 | 0.405 | −0.006 | 0.091 | 0.052 |
| | R | 0.864 | 0.911 | 0.926 | 0.363 | 0.396 | 0.461 | 0.035 | 0.081 | 0.116 |
| TEST PATTERNS GROUP 3 | A | 0.925 | 0.944 | 0.953 | 0.367 | 0.378 | 0.332 | 0.111 | 0.034 | 0.092 |
| | B | 0.906 | 0.947 | 0.953 | 0.394 | 0.582 | 0.496 | 0.042 | 0.169 | 0.080 |
| | R | 0.899 | 0.940 | 0.952 | 0.337 | 0.458 | 0.524 | 0.004 | 0.027 | 0.142 |

FLIP-FLOP

"AND" GATE

DELAY CIRCUIT

SHIFT REGISTER

AMPLIFIER

INTEGRATOR

NON-LINEAR CIRCUIT

July 20, 1965 L. P. HORWITZ ETAL 3,196,394

SPECIMEN IDENTIFICATION TECHNIQUES EMPLOYING NON-LINEAR FUNCTIONS OF AUTOCORRELATION FUNCTIONS

Filed March 3, 1961 24 Sheets-Sheet 16

United States Patent Office 3,196,394
Patented July 20, 1965

3,196,394

SPECIMEN IDENTIFICATION TECHNIQUES EMPLOYING NON-LINEAR FUNCTIONS OF AUTOCORRELATION FUNCTIONS

Lawrence P. Horwitz, Chappaqua, and Glenmore L. Shelton, Jr., Carmel, N.Y., assignors to International Business Machines Corporation, New York, N.Y., a corporation of New York Filed Mar. 3, 1961, Ser. No. 93,070
18 Claims. (Cl. 340—146.3)

This invention relates to specimen identification and in particular, to apparatus and methods wherein non-linear functions of autocorrelation functions of the specimens to be identified are compared to non-linear functions of autocorrelation functions of reference patterns.

Specimen identification devices generally utilize direct comparison between the specimen to be identified and reference patterns. In these devices, either vertical or horizontal misregistration of the specimen affects the comparison and the document containing the specimen must be held in a fixed position during identification.

The present invention uses comparison of non-linear functions of autocorrelation functions for identification. The autocorrelation function of a function provides a measure of the correlation of the function with itself, through various displacements. The autocorrelation function is inherently registration invariant. Imperfect-specimen identification is not hampered by the use of comparison of autocorrelation functions of the specimens rather than comparison of the specimens directly. Specimens may be identified while the document is in motion because of the registration invariance of the system. Certain non-linear functions of the autocorrelation function have been found to enhance identification while retaining the characteristic of registration invariance. The function to be described in detail with respect to the embodiment shown is a non-linearly weighted discriminating of the autocorrelation function. The particular discriminating function that is embodied is labelled a "second-difference" function.

A primary object is to provide a specimen identification apparatus and method making use of non-linear functions of autocorrelation functions to obtain registration invariance.

A further object is to provide a specimen identification apparatus and method making use of non-linear functions of autocorrelation functions for comparison to enhance discrimination.

A further object is to provide a specimen identification method and apparatus using non-linearly weighted "second-difference" functions of autocorrelation functions for comparison.

Another object is to provide a specimen identification method and apparatus using non-linearly weighted "second-difference" functions of autocorrelation functions for comparison, wherein the non-linear weighting that is used simplifies the apparatus required.

Another object is to provide an electronic specimen identification apparatus making use of non-linear functions of autocorrelation functions for comparison.

Another object is to provide an electronic specimen identification apparatus using non-linearly weighted "second-difference" functions of autocorrelation functions for comparison.

A further object is to provide a system for generating an electronic discriminating function of the autocorrelation function of an input signal.

Another object is to provide a specimen identification apparatus where discrete portions of a non-linearly weighted discriminating function of the autocorrelation function of the input specimen are generated using an electronic circuit and are compared using a resistor matrix with discrete portions of non-linearly weighted discriminating functions of autocorrelation functions of reference patterns.

Another object is to provide a specimen identification apparatus where discrete portions of a non-linearly weighted "second-difference" function of the autocorrelation function of the input specimen are generated using an electronic circuit and are compared using a resistor matrix with discrete portions of non-linearly weighted "second-difference" functions of autocorrelation functions of reference patterns.

The foregoing and other objects, features and advantages of the invention will be apparent from the following description of a preferred embodiment.

In accordance with a preferred embodiment of the invention, an autocorrelation function of the specimen is electronically generated. A non-linearly weighted discriminating function (the "second-difference" function) of this function is then generated and compared to similar functions of reference patterns.

The autocorrelation function is a measure of the correlation of a function with itself and is thus inherently registration invariant. If the specimen to be identified is considered to be a matrix of discrete areas having coordinates $(x, y)$ that are predominantly black or predominantly white, depending then upon the positions of the lines that the specimen comprises, there is a function $f(x, y)$ that is "1" for each instance where the area about the coordinates $(x, y)$ is black and "0" where white. The autocorrelation function defines the number of pairs of black areas separated by a given distance in a given direction, over all distances and directions. If $(x, y)$ is a point on the pattern, and $(x+x', y+y')$ is another point on the pattern separated from the point $(x, y)$ by $(x', y')$ then the product $f(x, y)f(x+x', y+y')=1$ only where both points are black. Since this procedure is performed on every pair of points in the pattern, the autocorrelation function $D(x', y')$ is defined as:

$$D(x', y')=\sum_{x,y} f(x, y)f(x+x', y+y')$$

Some functions of the autocorrelation function have been found to provide more discriminating specimen identification than is achieved by the use of the autocorrelation function itself by improving the distinction between patterns having certain similarities. One of the "discriminating" functions which improves distinction is the "second-difference" function of the autocorreleation function. This function $V(x', y')$ is defined as the function whose value at a point $(x', y')$ is obtained by multiplying the value of the autocorrelation function at the point $(x', y')$ by four and then subtracting the values of the autocorrelation function at the four adjacent points $(x'+1, y')$, $(x'-1, y')(x', y'+1)$ and $(x', y'-1)$. This may be defined as:

$$V(x' y')=4D(x', y')-D(x'+1, y') \\ -D(x'-1, y')-D(x', y'+1)-D(x', y'-1)$$

The autocorrelation function may be written in matrix form as follows:

| | | | | |
|---|---|---|---|---|
| $D(-n, m) \ldots D(-2, m)$ | $D(-1, m)$ | $D(0, m)$ | $D(1, m)$ | $D(2, m) \ldots D(n, m)$ |
| $\vdots$ | $\vdots$ | $\vdots$ | $\vdots$ | $\vdots$ |
| $D(-n, 2) \ldots D(-2, 2)$ | $D(-1, 2)$ | $D(0, 2)$ | $D(1, 2)$ | $D(2, 2) \ldots D(n, 2)$ |
| $D(-n, 1) \ldots D(-2, 1)$ | $D(-1, 1)$ | $D(0, 1)$ | $D(1, 1)$ | $D(2, 1) \ldots D(n, 1)$ |
| $D(-n, 0) \ldots D(-2, 0)$ | $D(-1, 0)$ | $D(0, 0)$ | $D(1, 0)$ | $D(2, 0) \ldots D(n, 0)$ |
| $D(-n, -1) \ldots D(-2, -1)$ | $D(-1, -1)$ | $D(0, -1)$ | $D(1, -1)$ | $D(2, -1) \ldots D(n, -1)$ |
| $D(-n, -2) \ldots D(-2, -2)$ | $D(-1, -2)$ | $D(0, -2)$ | $D(1, -2)$ | $D(2, -2) \ldots D(n, -2)$ |
| $\vdots$ | $\vdots$ | $\vdots$ | $\vdots$ | $\vdots$ |
| $D(-n, -m) \ldots D(-2, -m)$ | $D(-1, -m)$ | $D(0, -m)$ | $D(1, -m)$ | $D(2, -m) \ldots D(n, -m)$ |

The value of each point of the "second-difference" function is then obtained by a point-by-point multiplication of this matrix and the "second-difference" operator matrix:

$$\begin{matrix} 0 & -1 & 0 \\ -1 & 4 & -1 \\ 0 & -1 & 0 \end{matrix}$$

where the center point of the operator matrix is located at the coordinates corresponding to the coordinates of the point of the "second-difference" function that is to be evaluated. For example, the value of the "second-difference" function at a point (3, 4) is obtained by a point-by-point multiplication of:

$$\begin{matrix} 0 & -1 & 0 \\ -1 & 4 & -1 \\ 0 & -1 & 0 \end{matrix}$$

and $$\begin{matrix} D(2,\ 5) & D(3,\ 5) & D(4,\ 5) \\ D(2,\ 4) & D(3,\ 4) & D(4,\ 4) \\ D(2,\ 3) & D(3,\ 3) & D(4,\ 3) \end{matrix}$$

This value, V(3, 4) is thus obtained as follows:

$$V(3, 4)=4D(3, 4)-D(3, 5) -D(2, 4)-D(4, 4)-D(3, 3)$$

The "second-difference" function contains more points than the original autocorrelation function from which it is developed because non-trivial results are obtained when the operator matrix is centered along rows $(m+1)$ and $(-m+1)$ and along columns $(n+1)$ and $(-n+1)$ of an $m\ x\ n$ autocorrelation function matrix. Other discriminating functions may be obtained by the use of other operator matrices. In general, the use of an operator matrix having one or more positive elements and one or more negative elements will result in a discriminating function.

The "second-difference" function of the autocorrelation function may be used directly as the basis for comparison and the specimen identification system will have enhanced discrimination. In practice, however, certain non-linearly weighted functions of the "second-difference" function further enhance discrimination and simplify the apparatus required. In the embodiment to be described in detail below, the non-linear weighting consists of assigning all positive values of the "second-difference" function above a prescribed threshold a weight of +1 and all negative values below a prescribed threshold a weight of +1, while values between the positive and negative thresholds retain a weight of 0. The weighted "second-difference" function $V(x', y)$ of the autocorrelation function $D(x', y')$ is written as: $V^*(x', y')$. The function $V_S^*(x', y')$ of the specimen S is then compared, point-by-point, to each similar function $V_R^*(x, y)$ of the "second-difference" function $V_R(x', y')$ of the autocorrelation function of each reference pattern R to generate a sum $Q_{S,R}$ as follows:

$$Q_{S,R}=\sum_{x', y'} V_S^*(x', y')V_R^*(x', y')$$

The reference pattern "$n$" that produces the largest comparison sum is to determine the identification of the specimen. In order to accomplish proper identification the above comparison must be normalized by dividing $Q_{S,R}$ by $$\left[\sum_{x', y'} V_R^{*2}(x', y')\right]^{1/2}$$

A Schwartz inequality, as found on page 417 of a text authored by Wilfred Kaplan entitled Advanced Calculus, 1952, and published by Addison-Wesley Publishing Co., may be used to show that the normalized sum $S_{S,R}$:

$$S_{S,R}=\sum_{x', y'} \frac{V_S^*(x', y')V_R^*(x', y')}{\left[\sum_{x', y'} V_R^{*2}(x', y')\right]^{1/2}}$$

is a maximum when $V_S^*(x', y')=V_R^*(x', y')$ and hence the reference pattern R which is similar to the specimen S provides the largest sum $S_{S,R}$.

Non-linear functions $D_S^*(x', y')$ of the autocorrelation function $D_S(x', y')$ may be compared with similar functions $D_R^*(x', y')$ of the reference patterns to develop sums according to the following expression:

$$S_{S,R}=\sum_{x', y'} \frac{D_S^*(x', y')D_R^*(x', y')}{\left[\sum_{x', y'} D_R^{*2}(x', y')\right]^{1/2}}$$

Since $V_S(x', y')$ is a linear function of $D_S(x', y')$ and since $V_S^*(x', y')$ is a non-linear function of $V_S(x', y')$, $V_S^*$ is thus a non-linear function of $D_S(x', y')$. $V_S^*(x', y')$ may be considered to be a special example of $D_S^*(x', y')$.

The invention will be described in greater detail in connection with the accompanying drawings.

Figure 12A:
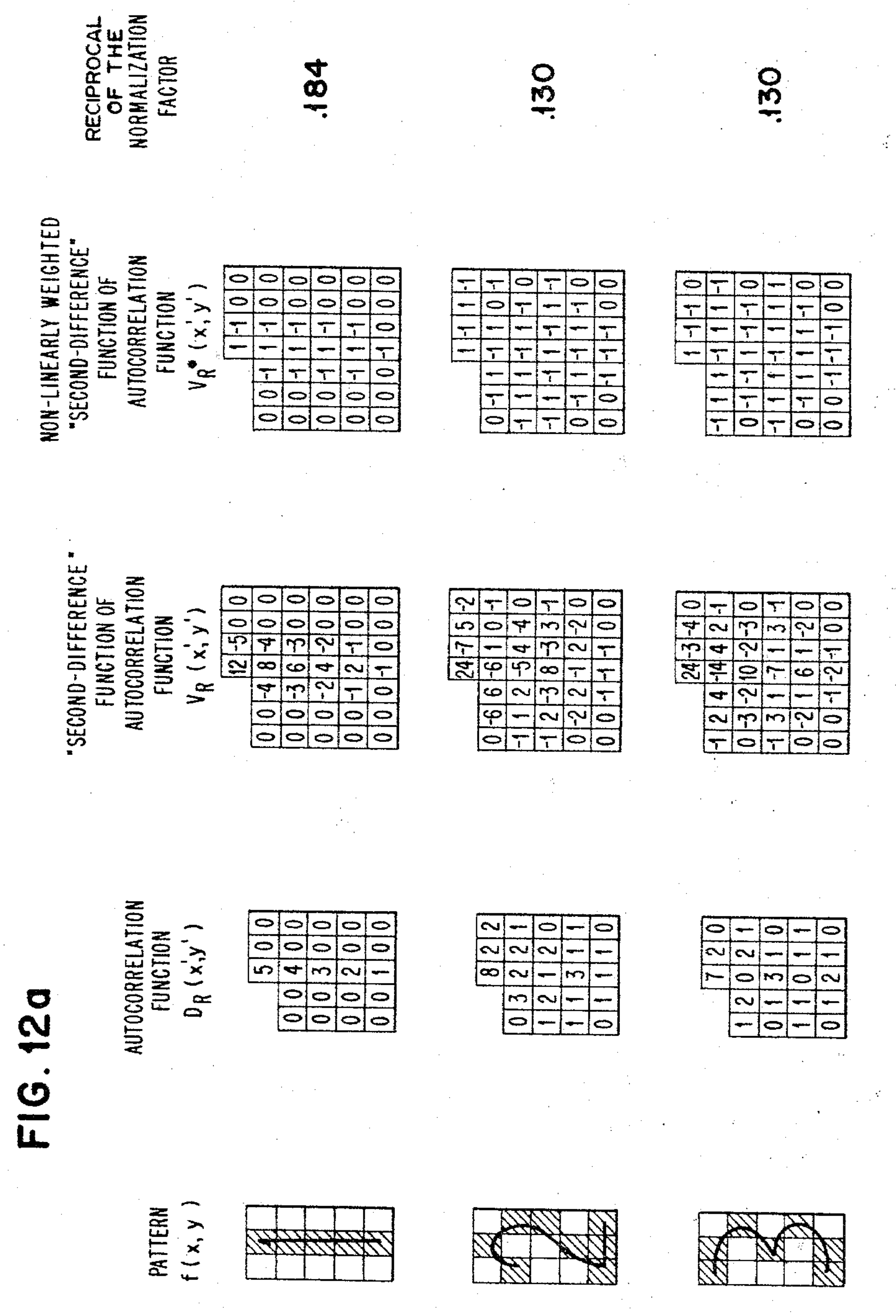
Figure 12B:
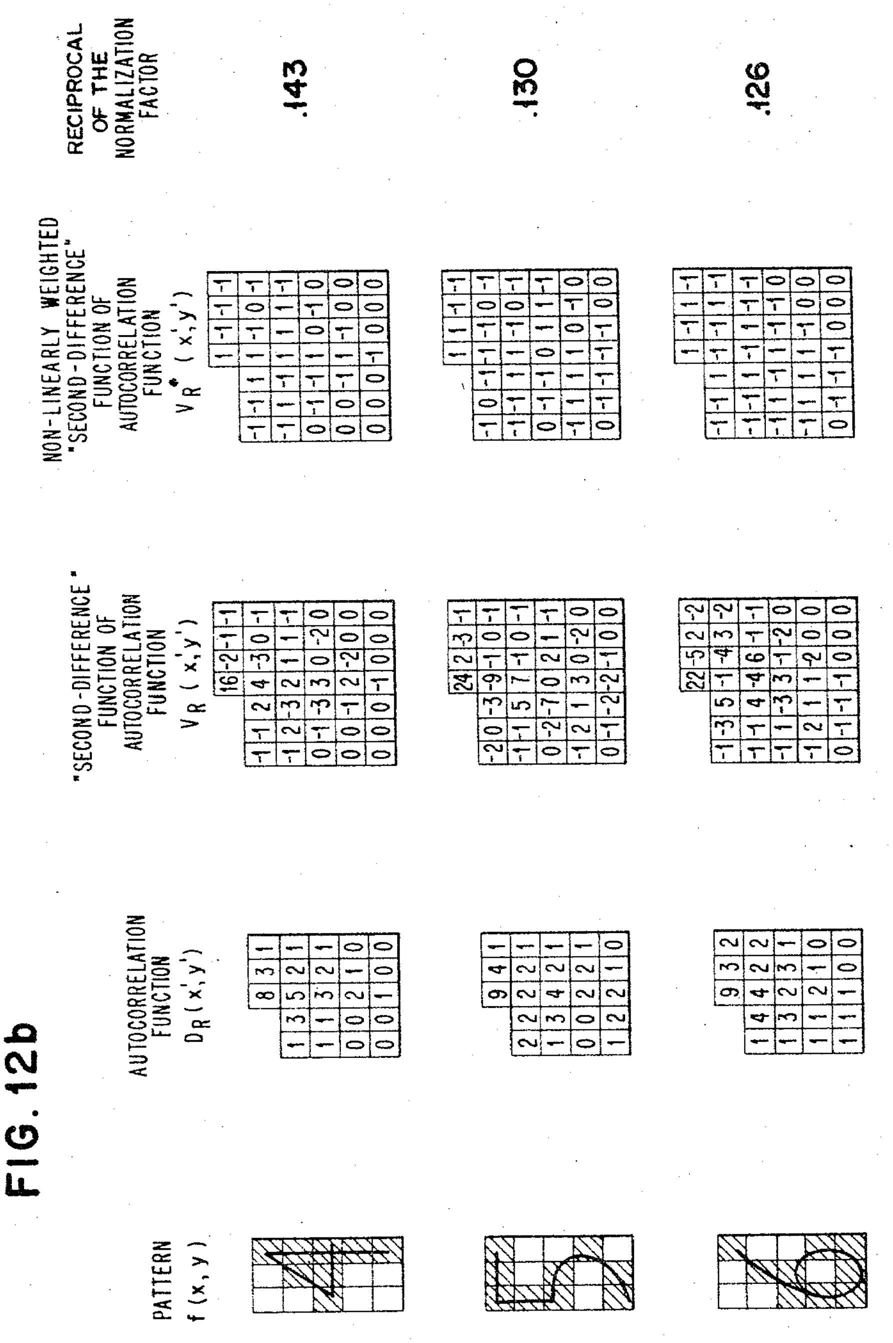
Figure 12C:
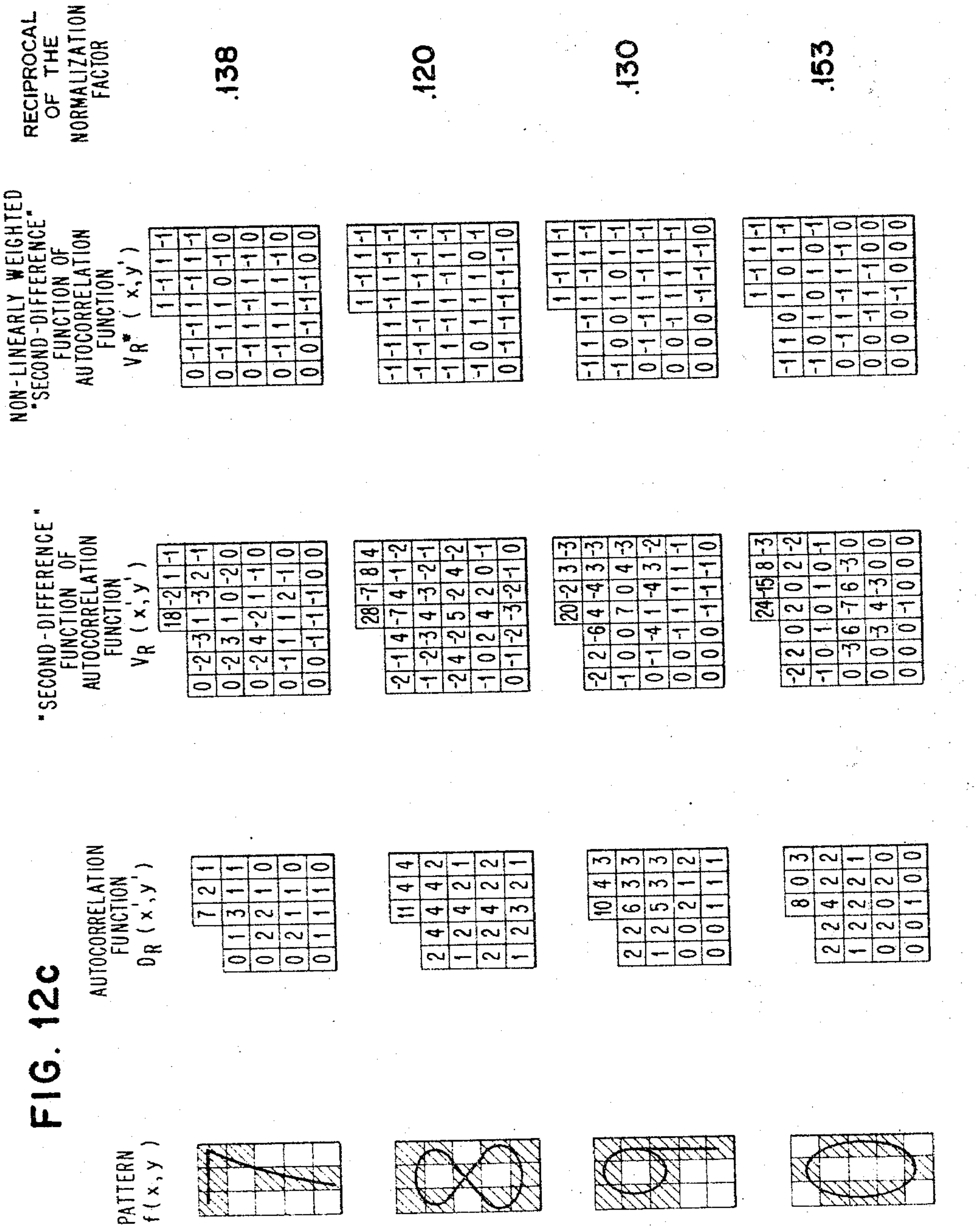
Figure 13A:
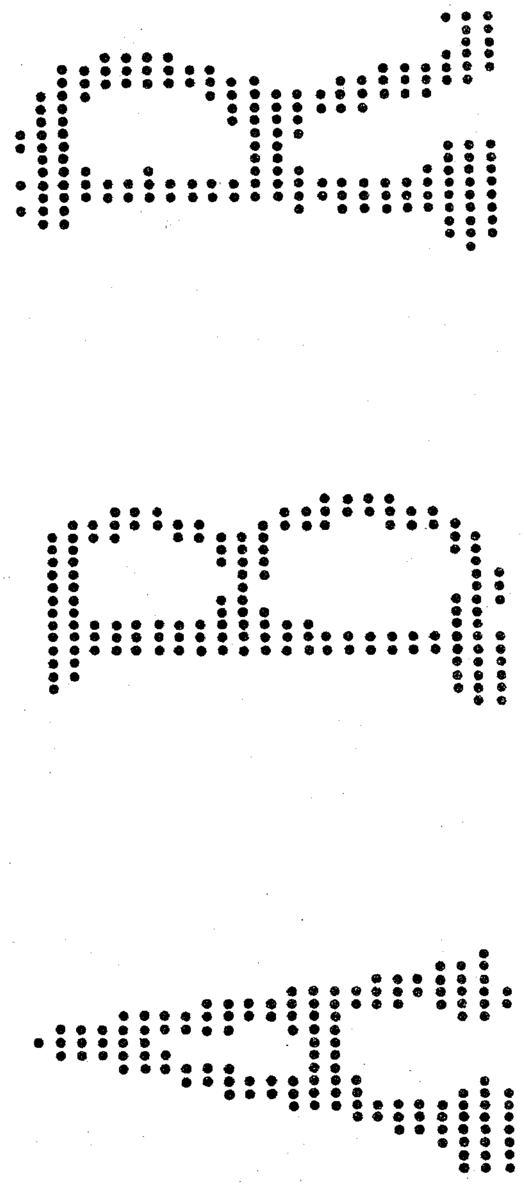
Figure 13B:
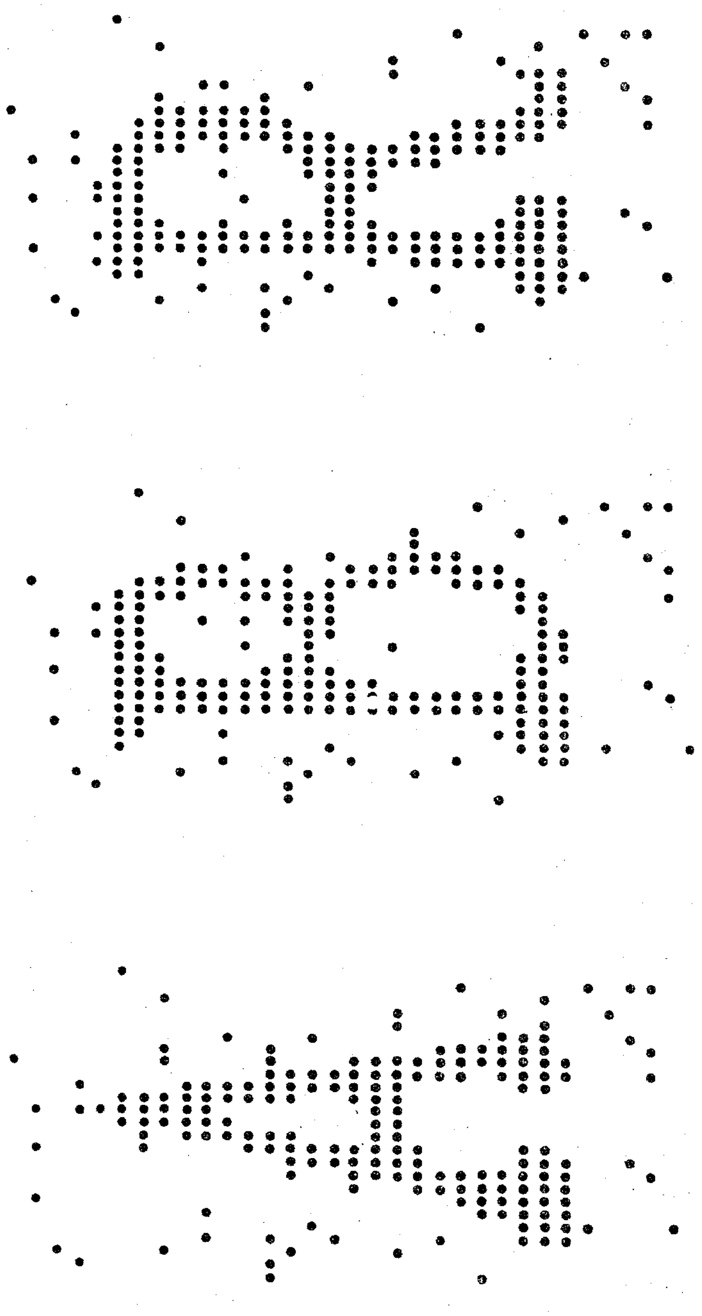
Figure 13C:
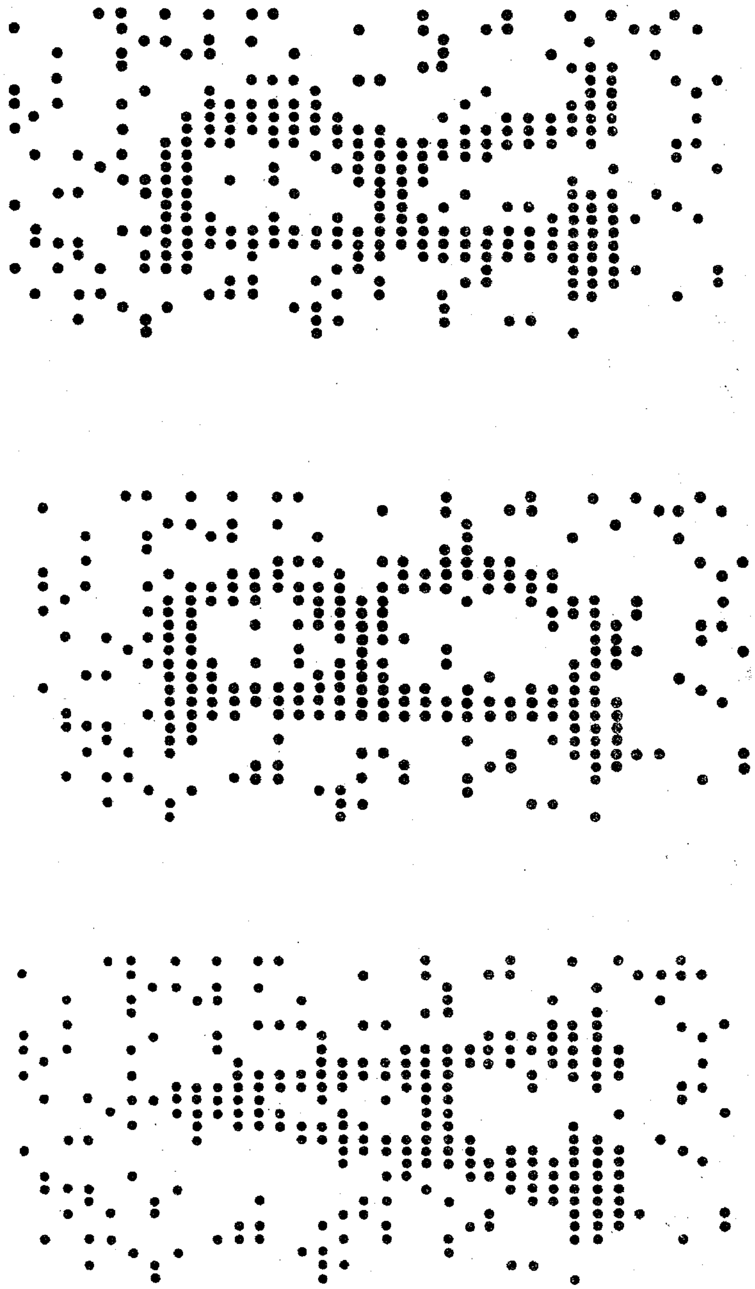
Figure 13D:
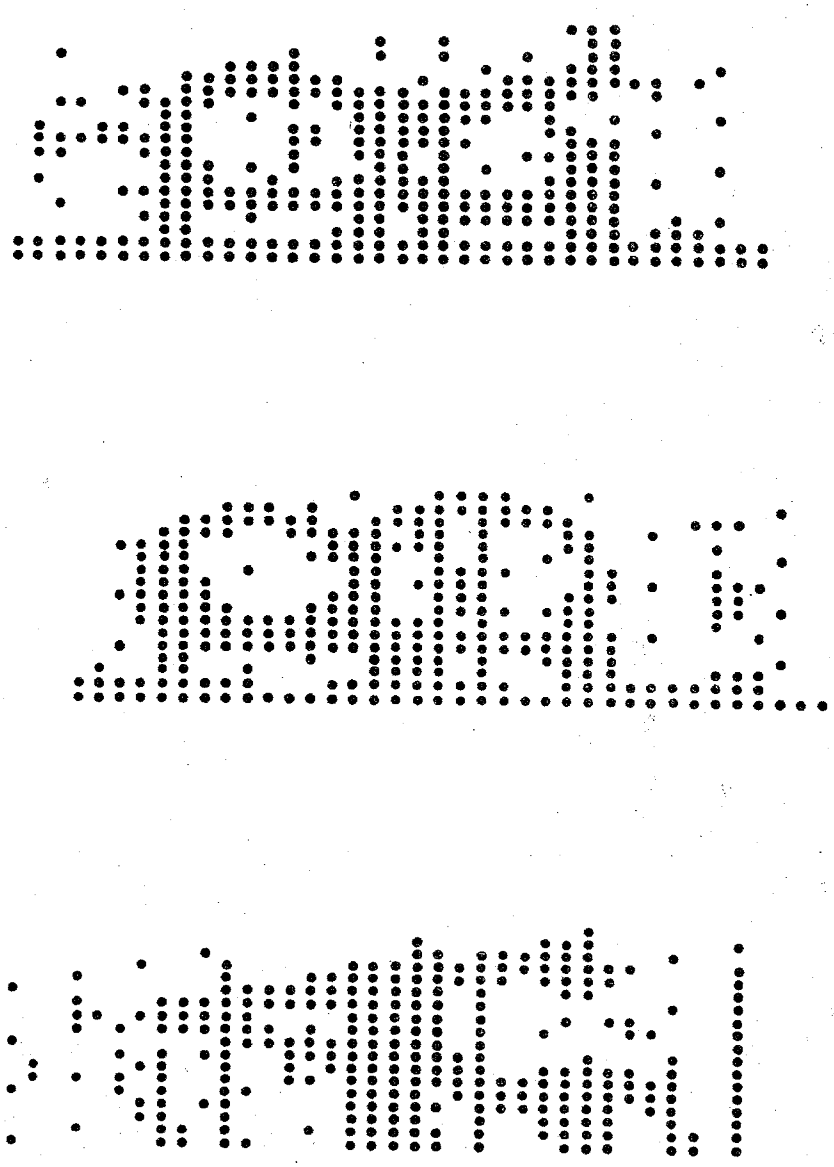

FIGURES 12*a*, 12*b* and 12*c* are charts showing the autocorrelation functions, the "second-difference" functions of the autocorrelation functions, and non-linearly weighted "second-difference" functions of the autocorrelation functions of ten arabic numerals.

FIGURES 13*a*, 13*b*, 13*c*, and 13*d* are a group of charts showing reference patterns and text patterns that were used to study the system stability and discrimination.

FIGURE 14 is a chart showing the stability and discrimination of the system in identifying the reference and test patterns shown in FIGURE 13.

Figure 20:
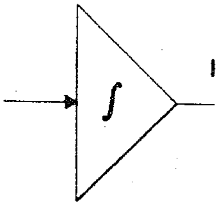
Figure 21:
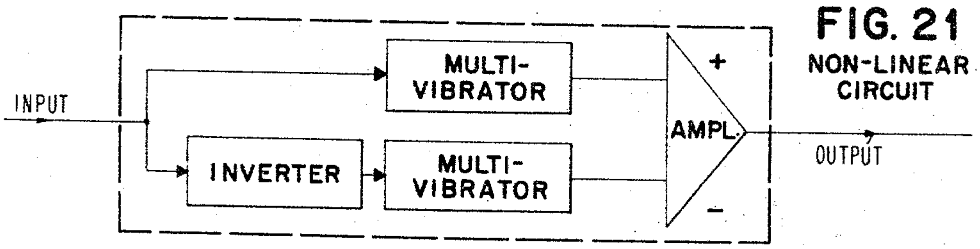
Figures 22, 22A:
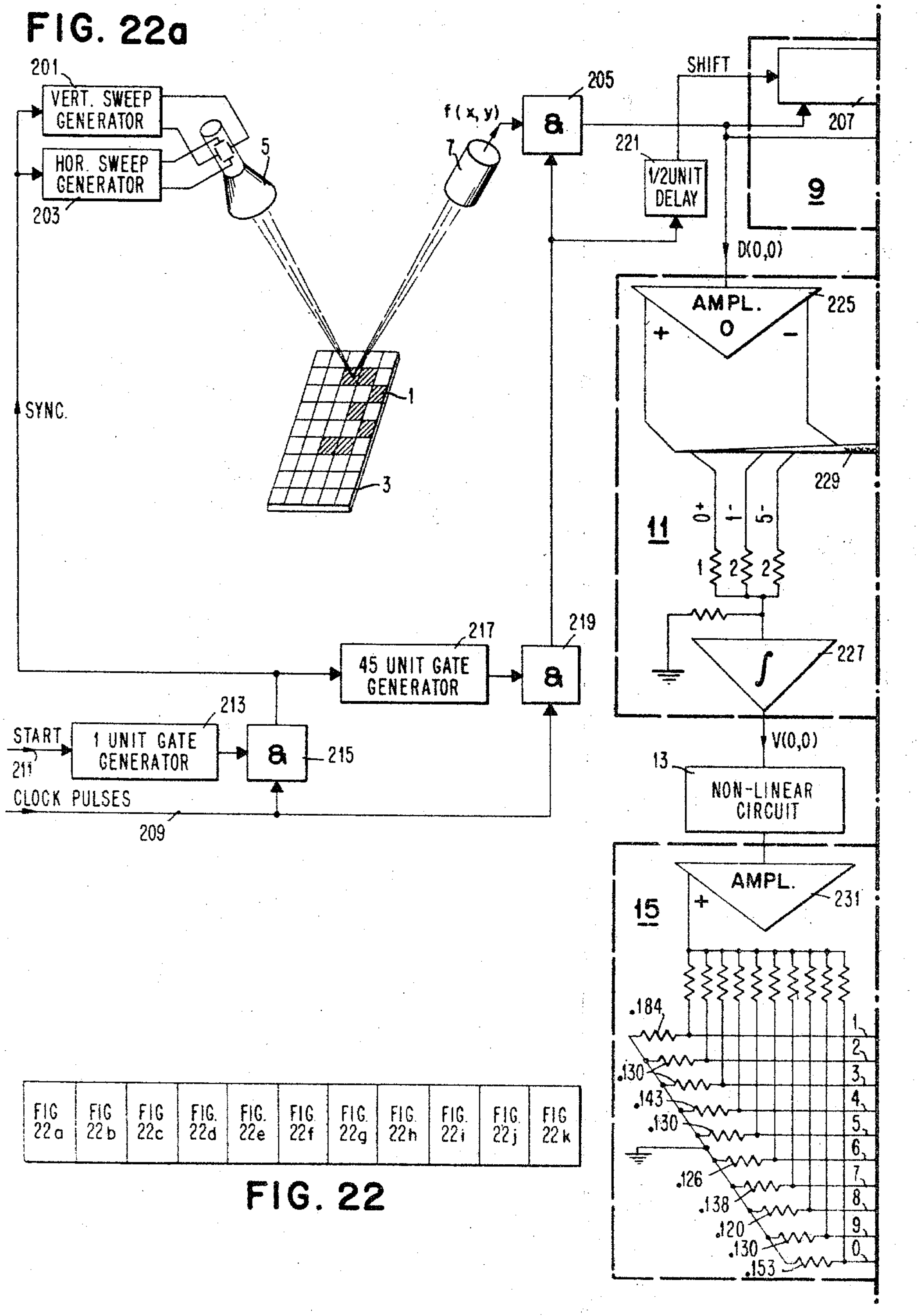
Figure 22B:
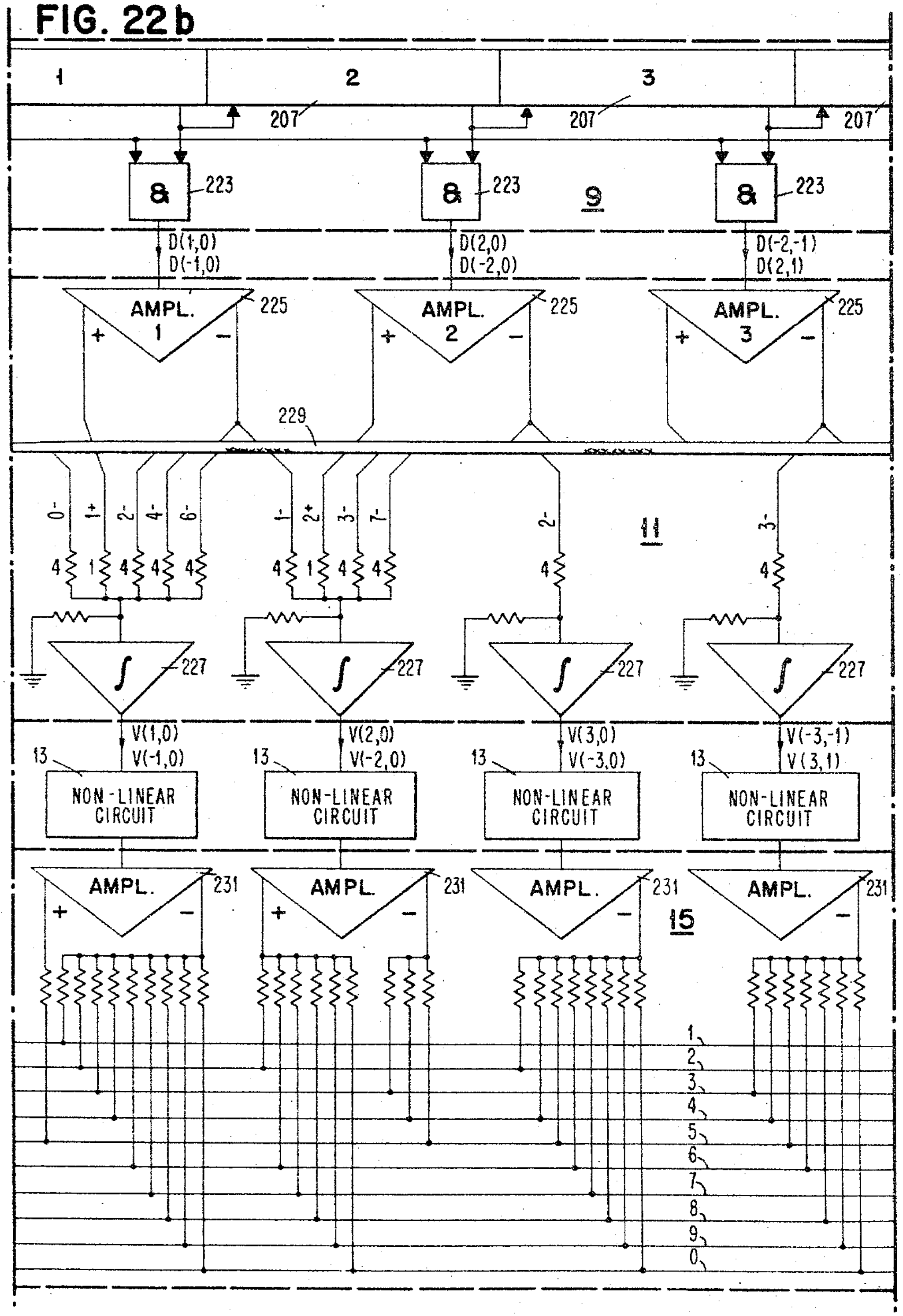
Figure 22C:
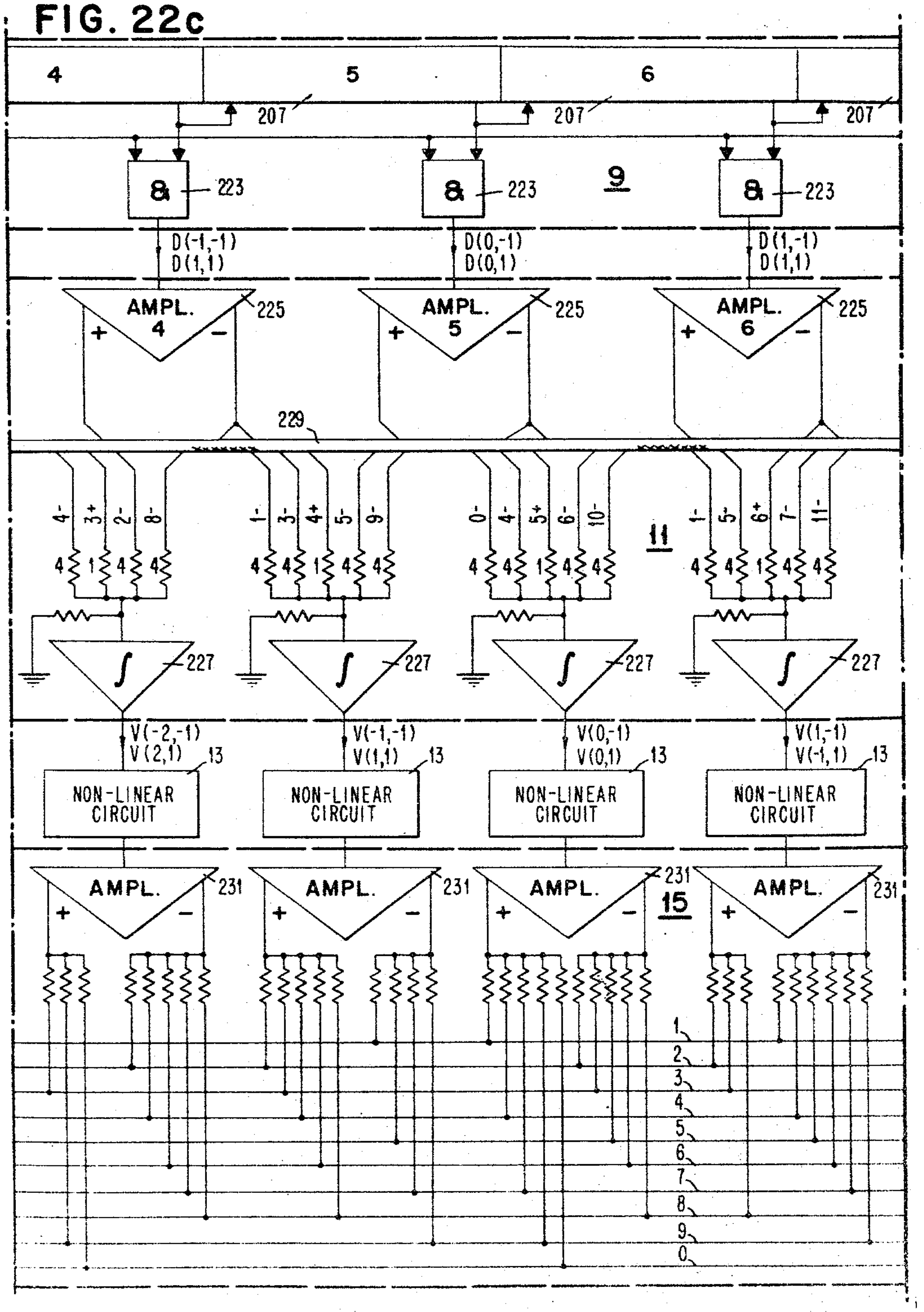
Figure 22D:
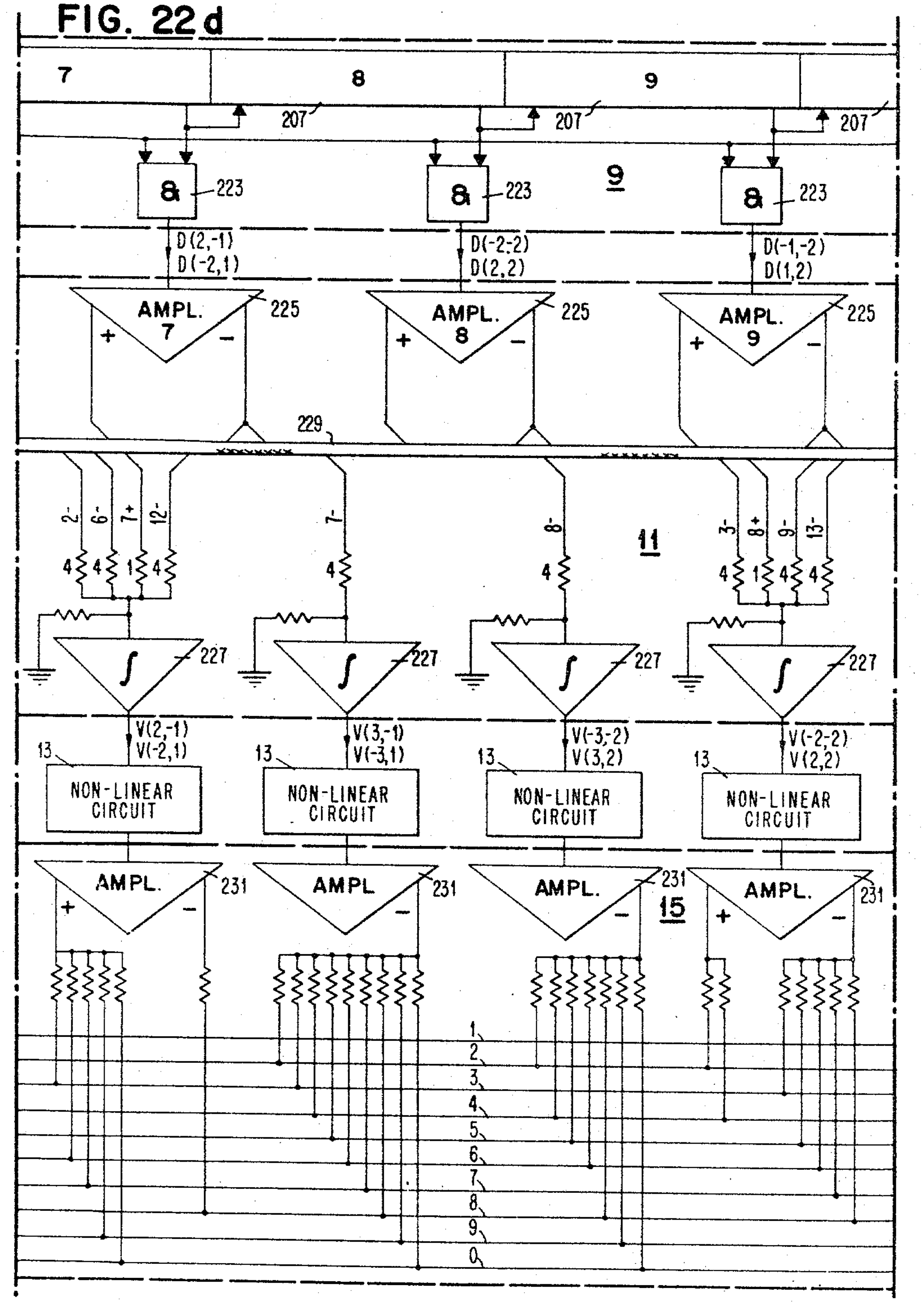
Figure 22E:
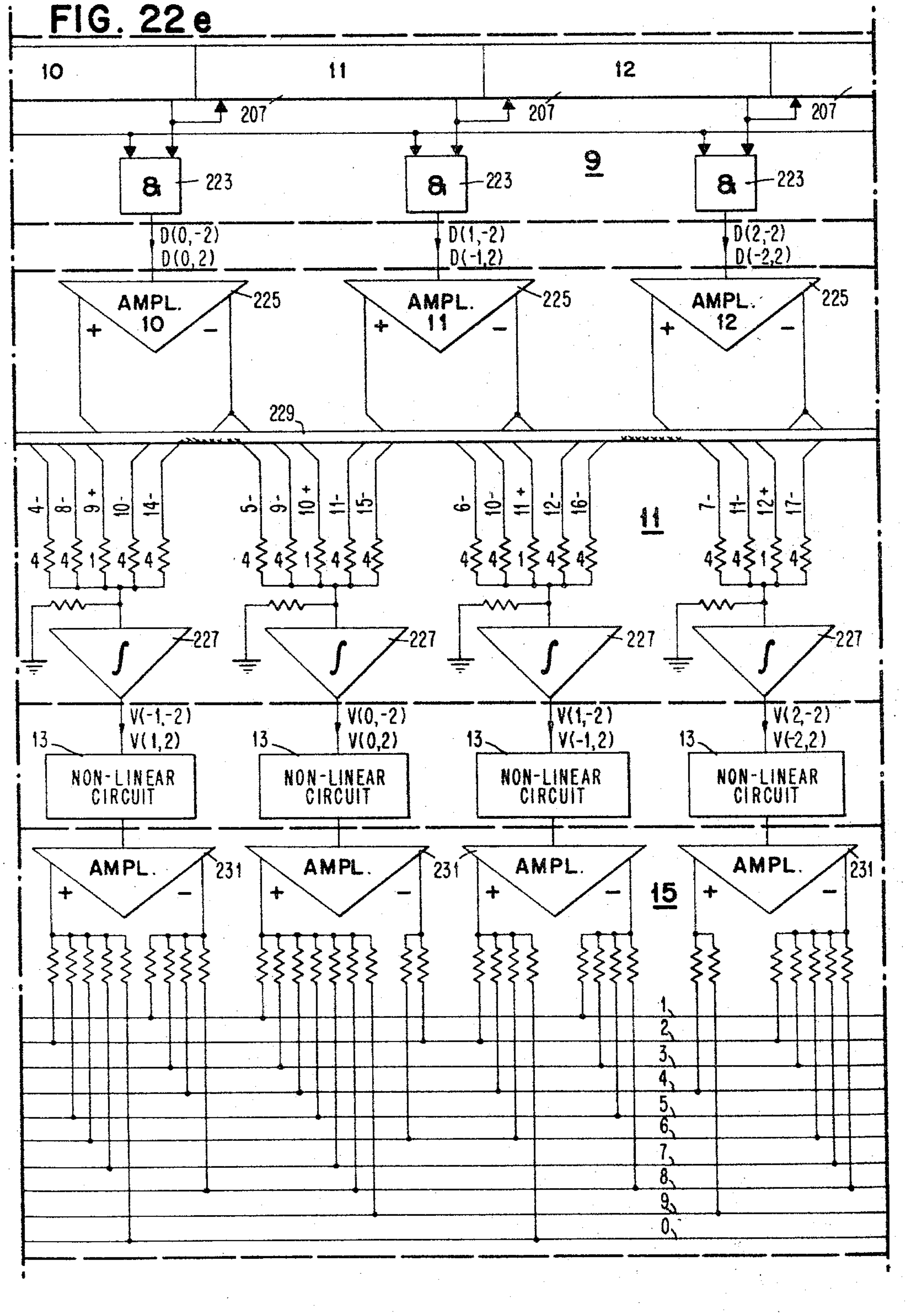

FIGURES 15 through 21 are diagrams showing the basic digital symbols used in FIGURE 22.

FIGURE 22 shows the relationship of FIGURES 22*a* through 22*k*.

Figure 1:
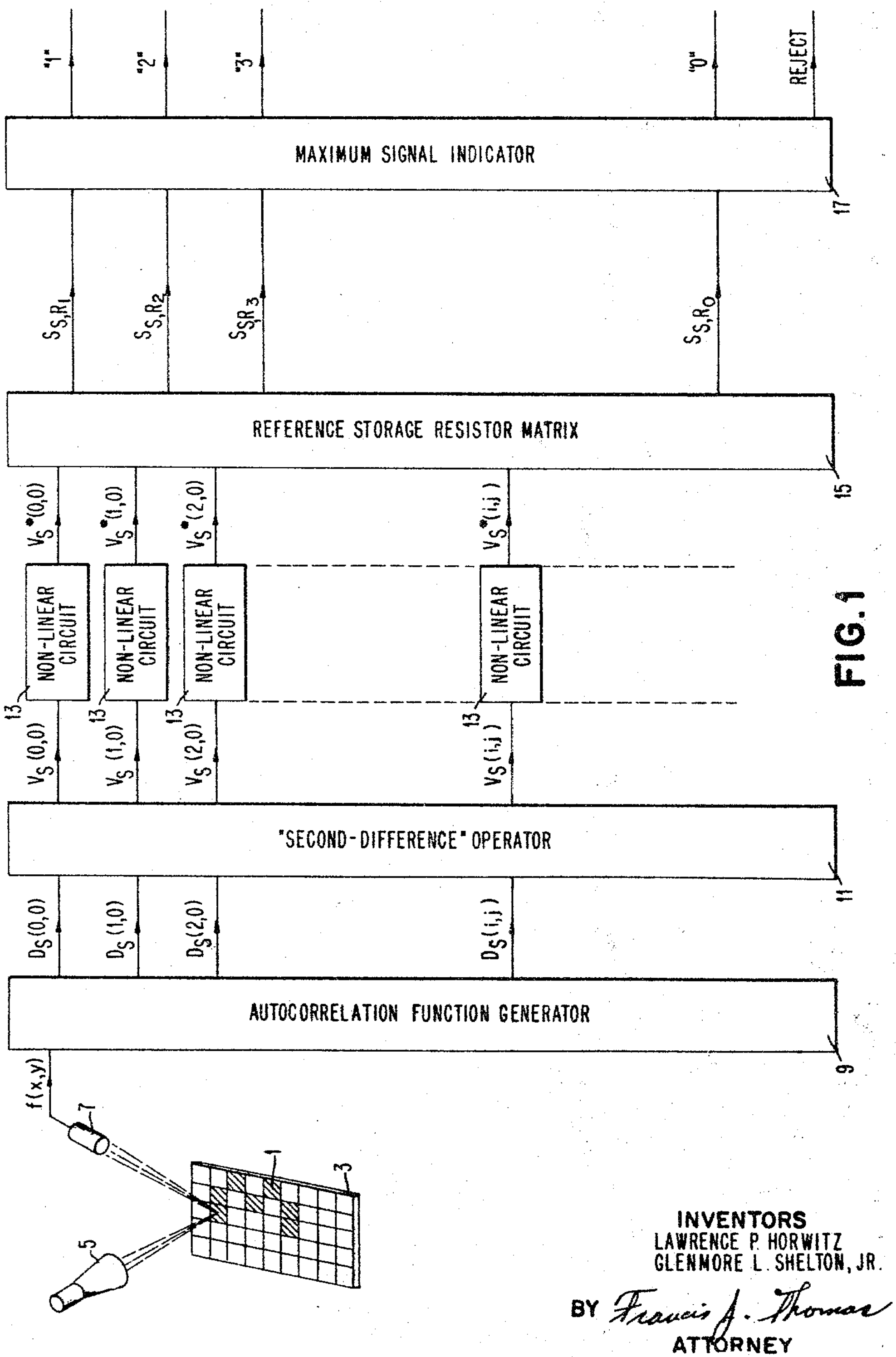
FIGURE 1 is a block diagram of a specimen identification apparatus utilizing comparison of non-linearly weighted functions of autocorrelation functions.

FIGURES 22a through 22k are schematic diagrams of the embodiment shown in FIGURE 1.

Figure 23:
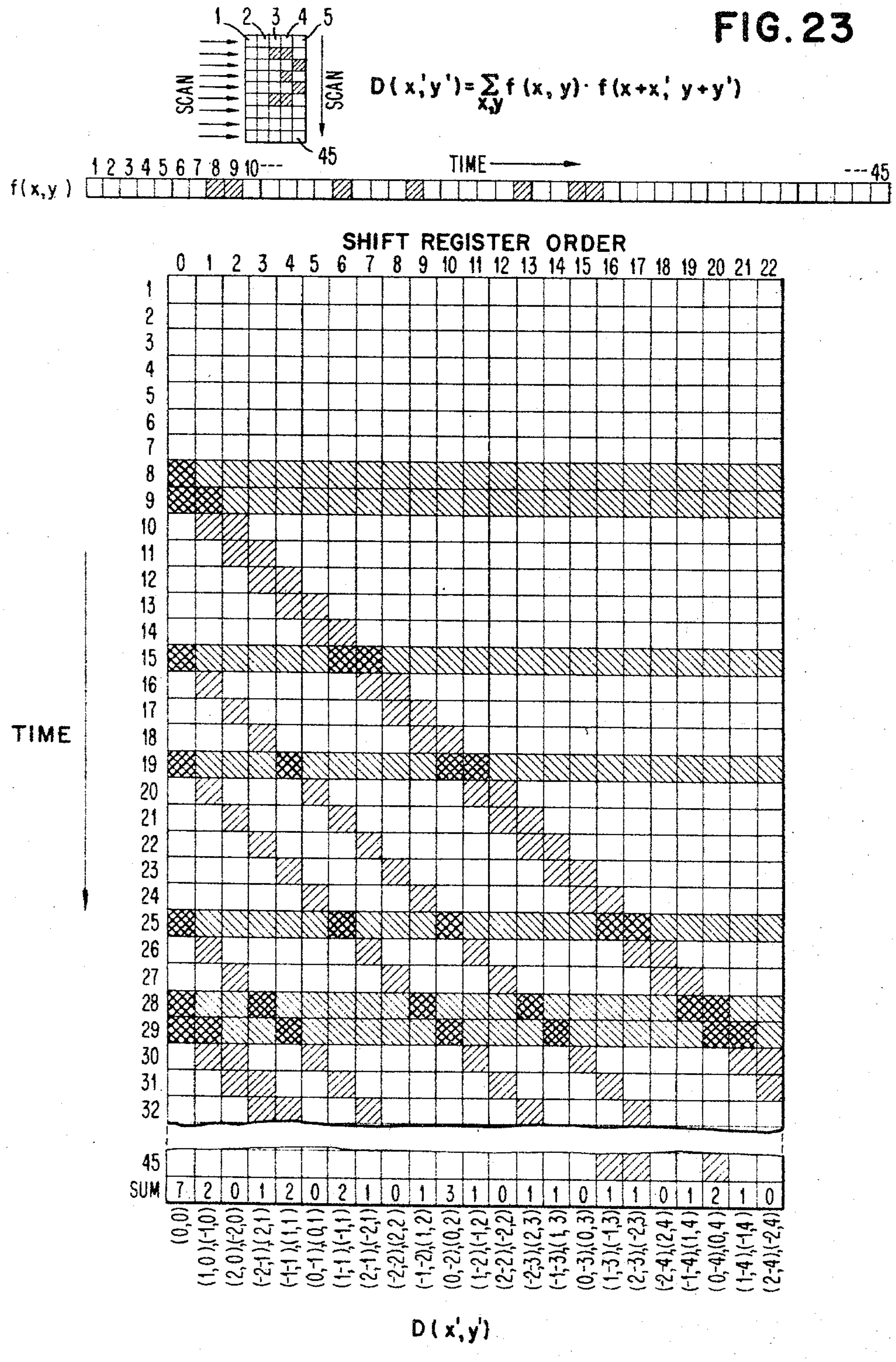

FIGURE 23 is a diagram showing the operation of the autocorrelation function generator used in the embodiment of FIGURE 22.

A block diagram of an embodiment of the invention is shown in FIGURE 1. A specimen 1 on a matrix 3 is scanned by a flying-spot scanner 5. A phototube 7 develops a signal indicative of the specimen. Any means for converting the specimen into electrical data may be used and the scanner and phototube illustrate one well-known means.

The autocorrelation function $D_S(x',y')$ of the specimen S is generated from the signal $f(x,y)$ by a function generator 9. A "second-difference" operator 11 generates the "second-difference" function $V_S(x',y')$ of the autocorrelation function which is applied to a group of non-linear circuits 13. These circuits generate the weighted function $V_S{}^*(x',y')$, which is applied to a resistor matrix 15 whose design is dependent upon non-linearly weighted "second-difference" functions $V_R{}^*(x',y')$ of the autocorrelation functions of the reference patterns. The matrix output represents the normalized sums $S_{S,R}$. These sums are applied to a maximum signal indicator 17 which provides an indication of the identity of the specimen or a "reject" indication if the specimen is not similar to any one of the reference patterns.

In order to provide a clear illustration of the principles of the invention which are embodied in the accompanying detailed descriptions, the manual generation of autocorrelation functions and "second-difference" functions of the autocorrelation functions are described below.

Since the autocorrelation function of a specimen is a measure of the correlation of the specimen with itself, it may be generated by comparing the specimen to be autocorrelated with itself, shifted in all directions and over all distances.

Figure 10:
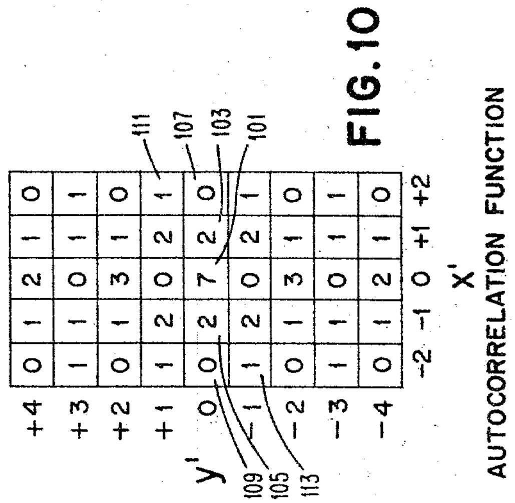
FIGURE 10 is a chart showing the autocorrelation function generated following the procedure in FIGURES 3 through 9.

FIGURES 2 through 9 illustrate a method of generating the autocorrelation function shown in FIGURE 10 for a typical pattern "3". The pattern is comprised of 15 discrete areas on a 3 x 5 matrix for simplicity of arithmetic. In practice, this invention is designed to be used to identify specimens comprising many discrete areas on a large matrix.

Figure 2:
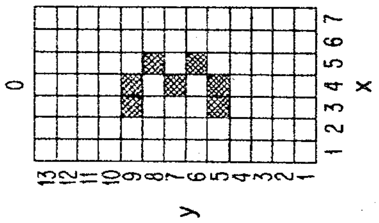
FIGURES 2 through 9 are a set of explanatory diagrams showing a procedure for generating the autocorrelation function of a typical pattern.

The pattern "3" formed by slant-left lines is common to FIGURES 2 through 9; the pattern formed by slant-right lines is shifted to various positions in the figures. FIGURE 2 illustrates the "0-shift" pattern, and hence, the slant-left and slant-right patterns are superimposed. If the discrete areas of the matrix are considered to have $x$ and $y$ coordinates as shown in FIGURE 2, $f(x,y)$ is "1" for $(x=3, y=9)$; $(x=4, y=9)$; $(x=5, y=8)$; $(x=4, y=7)$; $(x=5, y=6)$; $(x=4, y=5)$; and $(x=3, y=5)$. For all other values of $x$ and $y$, $f(x,y)=0$. The autocorrelation function $D(x',y')$ is determined by the equation:

$$D(x', y')=\sum_{x,y} f(x, y)f(x+x', y+y')$$

Figure 3:
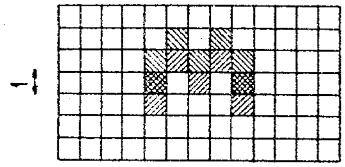
Figure 4:
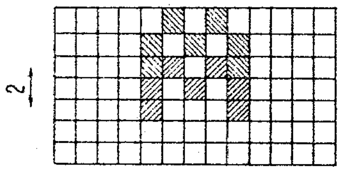
Figure 5:
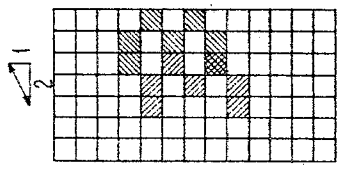
Figure 6:
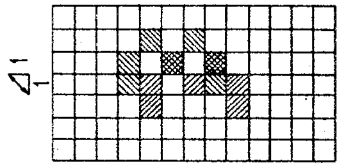
Figure 7:
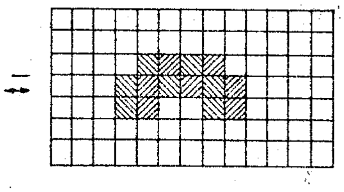
Figure 8:
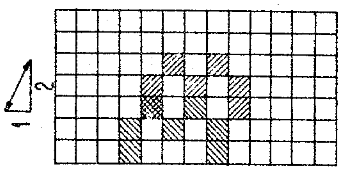
Figure 9:
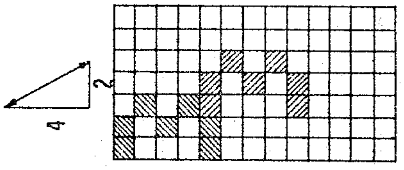

In the "0-shift" condition (FIGURE 2), $x'=y'=0$ and the sum is merely a count of the number of areas that are filled by the pattern, as the product $f(x,y)\ f(x+0, y+0)=1$ whenever $f(x,y)=1$. This sum is "7" for the pattern in FIGURE 2, and it is placed in the "0-shift" position 101 in the table in FIGURE 10. FIGURE 3 illustrates the conditions present for a shift of one unit to the right (designated as $x'=1$, $y'=0$), which causes a "2" to be placed at the corresponding position 103 of the table in FIGURE 10 as there are two coincident areas on the matrix. Position 103 is displaced one unit to the right of position 101 $(x'=1, y'=0)$ to correspond to a shift of one unit to the right of the pattern in FIGURE 3. A "2" is also placed in position 105 of the table as a shift to the left of one unit $(x'=-1, y'=0)$ obviously produces the same result as a shift to the right of one unit $(x'=1, y'=0)$. In a similar manner, positions 111 and 113 of the table are filled with "1's" as determined by FIGURE 5. FIGURES 6 through 9 illustrate the conditions present for several other combinations of $x'$ and $y'$. Using this procedure the entire autocorrelations table of FIGURE 10 may be filled in for the typical pattern "3."

Figure 11:
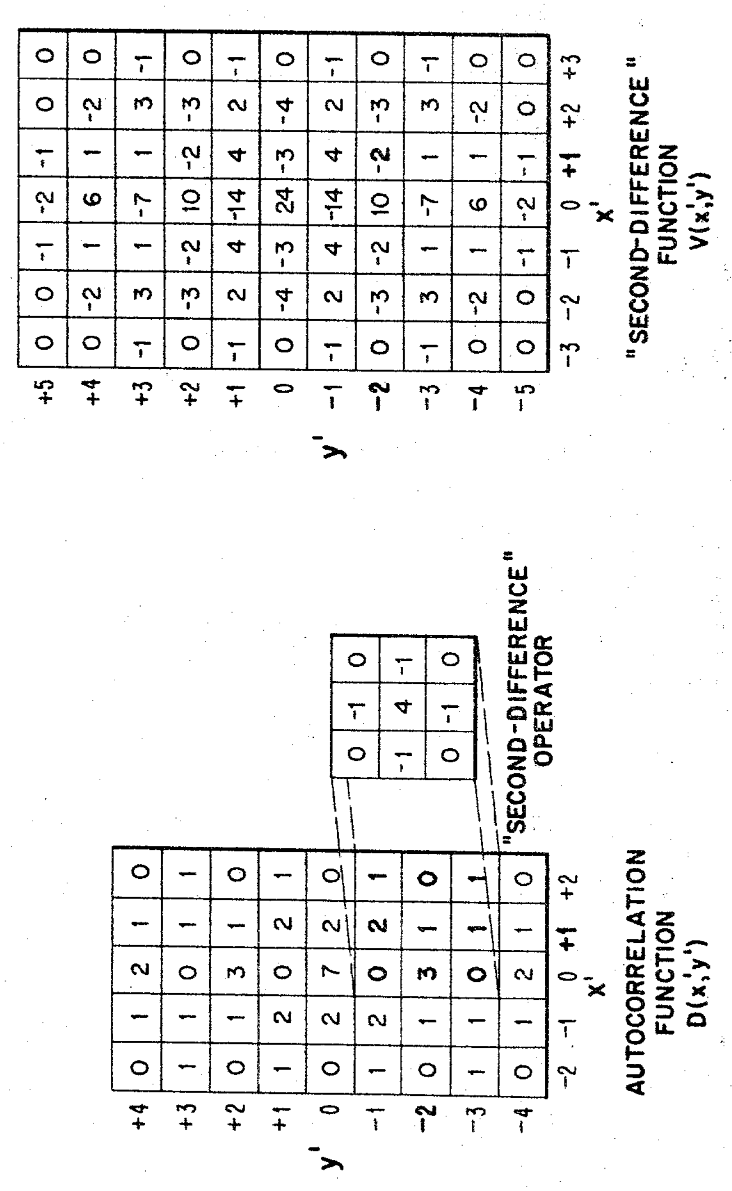
FIGURE 11 is a chart illustrating the generation of the "second-difference" function of the autocorrelation function.

The diagrams in FIGURE 11 illustrate a method of generating the "second-difference" function $V(x',y')$. The value of each point of this function is computed point-by-point by multiplying the operator matrix and a portion of the autocorrelation function matrix and then summing the products. In the example illustrated, the operator matrix is centered around the point $(x'=+1, y'=-2)$ of the autocorrelation function matrix. The multiplications provide products as follows:

$$(4)(1)-(1)(2)-(1)(3)-(1)(0)-(1)(1)=2.$$

This result appears in the "second-difference" function matrix at location $(x'=+1, y'=-2)$. The remainder of the matrix may be calculated by shifting the operator matrix to the corresponding positions and performing similar arithmetic.

It may be noted that both the autocorrelation function matrix and the "second-difference" function matrix contain symmetry about their center points.

FIGURE 12 shows ten arabic numeral patterns on 3 x 5 matrices; their autocorrelation functions; the "second-difference" functions and non-linearly weighed "second-difference" functions of their autocorrelation functions; and the reciprocals of their normalization factors. All functions are shown in abbreviated form, omitting the redundant "reflected" portions.

The non-linearly weighted functions $V_R{}^*(x',y')$ are generated by replacing all positive values with +1 and all negative values with −1. The normalization factors have been defined as:

$$\left[\sum_{x',y'} V_R{}^{*2}(x'\ y')\right]^{1/2}$$

Since $V_R{}^*(x',y')$ is +1, 0, or −1 for all values of $x',y'$, $V_R{}^{*2}(x',y')$ is either +1 or 0 and the sum $$\sum_{x',y'} V_R{}^{*2}(x', y')$$

is equal to the number of "1's" in the function $V_R{}^*(x',y')$. The sum equals 29 for the reference pattern 1. (15 "1's" are shown in FIGURE 12a and 14 more "1's" are present in the reflected portion of the matrix that is not shown). Thus, the normalization factor for the reference pattern 1 is $\sqrt{29}=5.38$ and the reciprocal of the normalization factor is approximately 0.184. The reciprocals are used rather than the normalization factors because normalization is accomplished in the embodiment to be described by the use by the use of voltage dividers having configurations requiring resistors with ohmic values dependent upon the reciprocals of the normalization factors.

Autocorrelation function comparison provides accurate and stable identification of specimens. Further accuracy and stability of identification are achieved by use of a discriminating function such as the "second-difference" function. The system performance is still further enhanced by certain non-linear weightings of these functions. An example of the accuracy and stability of identification is based on the reference and test patterns shown in FIGURE 13. The patterns A, B and R are used because of their similarity in structure to show the system performance under adverse conditions. Three groups of test patterns are illustrated. The group 1 test patterns are generated by the random addition of fifty noise bits; the group 2 test patterns include 150 noise bits. The group 3 test patterns include about 150 noise bits in a smaller specimen field, making these patterns the most difficult to identify.

The correlation table in FIGURE 14 shows the stability of system performance in identifying the reference and test patterns. The results have been normalized so that an ideal input specimen (reference pattern input) provides an identification factor of "1." Note that the ideal patterns are correctly identified using autocorrelation function [D(x',y')] comparison, "second-difference" function [V(x',y')] comparison, and non-linear function [V*(x',y')] comparison but that [V*(x',y')] comparison provides greater discrimination. The group 1 test patterns are also correctly identified by all comparison techniques, with the greatest discrimination for V*(x',y') comparison. The group 2 test patterns "A" and "B" are incorrectly identified using D(x',y') comparison, but all group 2 test patterns are correctly identified using V(x',y') an V*(x',y') comparison. The group 3 test patterns "A" and "B" are incorrectly identified using D(x',y') comparison and the group 3 test pattern "A" is incorrectly identified using V(x',y') comparison. V*(x',y') comparison provides correct identification of all test patterns.

The schematic diagram of the embodiment (FIG. 22) to be described later includes several symbols for circuits (such as "and" gates, threshold circuits, etc.). These are now explained in detail with respect to FIGURES 15 through 21.

R. K. Richards, Digital Computer Components and Circuits, 1957 published by Van Nostrand, provides a basic introduction to digital circuits and schematic diagrams of circuits that could be used in this invention.

Figure 15:
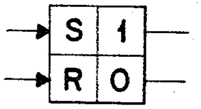

FIGURE 15 shows a basic bistable circuit, which is referred to as a flip-flop. The flip-flop is set by applying a signal to the set (S) input. This provides a signal at its "1" output. This circuit is reset by applying a signal to the reset (R) input which provides a signal at the "0" output. There is no effect on the circuit if an "S" input is applied when a circuit is already set, or if an "R" input is applied when previously reset.

Figure 16:
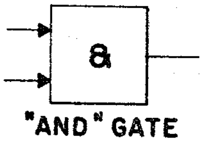
Figure 17:

An "and" gate, as shown n FIGURE 16 provides an output if all inputs receive signals at the same time. A delay circuit is shown in FIGURE 17. Signals applied to this circuit are passed after a period of time without being affected in shape or amplitude.

Figure 18:
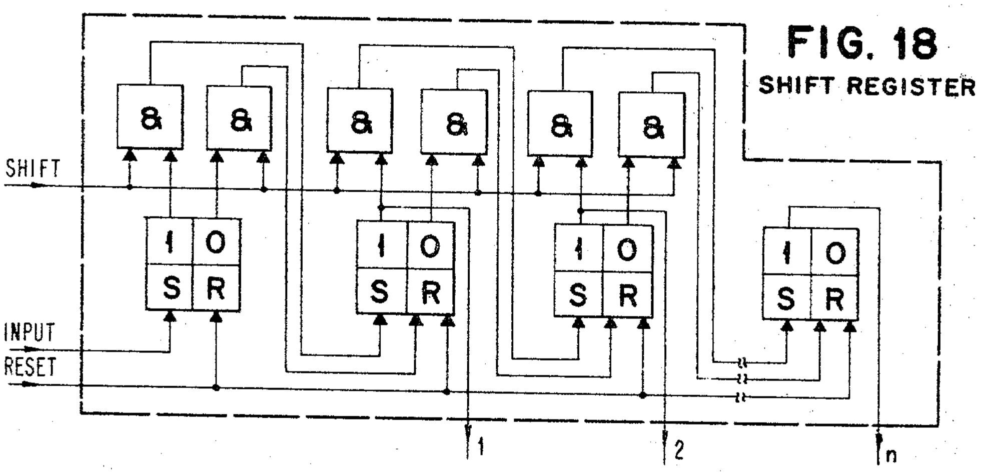

A shift register is shown in FIGURE 18. This register is comprised of a group of shift register "sections" in tandem. An explanation of these and other shift register sections is provided in a text authored by R. K. Richards entitled Arithmetic Operations in Digital Computers, 1955, published by Van Nostrand, Library of Congress Classification QA76.R5, on pages 144–148. A reset input is applied to each flip-flop in the register. The data input to the shift register is applied serially to the set input of the lowest-order flip-flop. Shift pulses are applied to the shift register in between each input data bit. These pulses condition the "and" gates which cause the data stored in each flip-flop to be transferred to the next highest order flip-flop. Outputs are provided to indicate the data in the various orders of the register.

Figure 19:
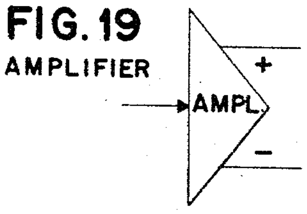

An amplifier having two outputs is shown in FIGURE 19. This circuit provides an amplified representation of its input at the + output and an amplified inverted representation of its input at the − output. This circuit can be readily constructed in many ways, as for example, from two cascaded inverting D.C. amplifiers, the first with the desired amplification factor and the second with an amplification factor of one. The first amplifier thus provides the inverted (−) output and the second amplifier provides the non-inverted (+) output.

A non-inverting analog integrator is shown in FIGURE 20. This circuit can be constructed by cascading a conventional inverting integrator and an inverter (D.C. amplifier).

A non-linear circuit is shown in FIGURE 21. This circuit, which may also be referred to as a "threshold circuit," is designed to provide one of three outputs: a positive level (+1), a negative level (−1) or a zero level.

Single-shot multivibrators (labelled S) are used to generate positive output levels when positive signals above a threshold are applied to their inputs. The output is present for a period of time after the input signal has terminated, and then the circuit automatically resets. Rapidly resetting multivibrators are used in this circuit. If the applied signal exceeds the threshold value of the multivibrators and is of a positive polarity, the upper multivibrator generates a positive output level. Negative input signals have no effect on the upper multivibrator, but are inverted to cause the lower multivibrator to generate a positive level. A difference amplifier subtracts the lower (− input from the upper (+ input) to generate a difference signal. Thus, if a sufficiently positive signal is applied to the non-linear (threshold) the upper multivibrator is operated and a positive output signal is generated by the difference amplifier. If a sufficiently negative signal is applied, the lower multivibrator is operated and its positive output is inverted by the difference amplifier to generate a negative output signal. If the input signal is insufficient in amplitude to operate a multivibrator, a zero output is generated by the circuit.

The specimen identification system embodied in the block diagram of FIGURE 1 is shown in detail in FIGURE 22. Common reference numerals are used wherever possible.

A three-by-five specimen 1 to be identified is located on a five-by-nine matrix 3. A flying spot scanner 5 scans the matrix under the control of a vertical sweep generator 201 and a horizontal sweep generator 203. A signal indicative of the specimen is developed by a phototube 7 and passed by an "and" gate 205 to the lowest order of a shift register 207 in an autocorrelation function generator 9. The system is synchronized by clock pulses applied on a lead 209. A start signal on a lead 211 is applied to a 1-unit gate generator 213 which develops a conditioning level to an "and" gate 215. The first clock pulse after the occurrence of the start signal is used to synchronize the sweep generators. This pulse is also applied to a 45-unit gate generator 217 which develops a conditioning level for an "and" gate 219. This gate passes the subsequent 45 clock pulses to "and" gate 205 to "sample" the photo-tube 7 output as the matrix areas are scanned. The output pulses from "and" gate 219 are also applied through a ½ unit delay 221 as "shift" pulses for the shift register 207. Thus, the matrix areas are serially scanned and the specimen data is applied to the shift register 207. The shift pulses from the ½ unit delay 221 cause the data to be sequentially transferred through the register toward the higher orders. The output of the "and" gate 205 is labelled D(0,0) because the autocorrelation function sum for a zero displacement is merely the sum of the bits of the input function.

The autocorrelation function generator provides pulse train outputs which, if accumulated, would provide the appropriate autocorrelation function sums. The remaining autocorrelation function D(x',y') sums are each serially generated by the action of the shift register 207 and a group of "and" gates 223.

The autocorrelation function sums were manually generated, as described with respect to FIGURES 2 through 10, by shifting the specimen various amounts (x',y') with respect to itself and checking for areas where the unshifted and shifted patterns coincided. The function may also be obtained by shifting vectors (x',y') throughout the matrix (over all x,y) and checking for areas where both ends of the vectors coincide with areas of the specimen. This procedure is simulated in the embodiment shown in FIGURE 22. Each "and" gate 223 has two inputs: one input represents the undelayed specimen data from "and" gate 205; the second input represents the delayed (shifted) specimen data which is obtained from the appropriate shift register output. Thus, each "and" gate 223 provides an output pulse for each pair of specimen data bits that are displaced from each other by an amount which depends upon the "and" gate input connection to the shift register.

FIGURE 23 is a chart illustrating the operation of the autocorrelation function generator for a sample specimen. The matrix is scanned from left to right and from top to bottom as illustrated by the arrows, to generate a function $f(x,y)$. Time is considered to start at the beginning of the scan and is divided into 45 parts representing the 45 matrix areas. This function is applied to the first order of the shift register and, as shown in the chart by slant-right lines, progresses toward the higher orders; moving one order during each time interval. The first column of the chart, labelled the "0" order, is indicative of the input to the register, and the column, if summed, would provide "7" which is the autocorrelation function sum for a zero displacement. Slant-left lines are placed in those rows which contain a bit in the first (0-order) column. The chart areas that contain both slant-left and slant-right lines are indicative of the "and" gates 223 (FIG. 22) that provide outputs at any given time. Since the last input bit occurs at time 29, there are no "and" gate outputs after this time and the chart is broken below his row. The columns are labelled at the bottom of the chart to coincide with the "and" gate output labels on FIG. 22. Although the system does not accumulate the bits to form autocorrelation function sums, as such, the sums are indicated at the bottom of the chart and may be found to compare with the sums shown in FIGURE 12*a*. The system includes integrators in the "second-difference" operator circuit (to be discussed later) which serve the purpose of accumulation.

If an $m \times n$ specimen is to be identified, where $m$ is the specimen width, then a matrix that equals or exceeds $2m-1$ in width is necessary. If vertical scanning were utilized, the matrix height would have to equal or exceed $2n-1$. The remaining dimension need only be sufficient to contain the specimen. These minimum dimensions must be adhered to in order to maintain adequate blanks between lines for the simple, one-dimensional shift register technique of function generation to operate properly. If the matrix is made larger than the required minimum, additional shift register orders having useless outputs are needed.

The autocorrelation function generator 9 of the embodiment shown in FIGURE 22 produces only the nonredundant portion of the function. The entire function may be generated by using a shift register having a number of orders equal to one less than the number of matrix areas (44) and an equal number of "and" gates. In this case the common "and" gate input is taken from the last order of the first half of the register (22nd) order. The "second-difference" operator has been shown to be the 3 x 3 matrix:

$$\begin{matrix} 0 & -1 & 0 \\ -1 & 4 & -1 \\ 0 & -1 & 0 \end{matrix}$$

The "second-difference" operator circuit 11 performs the required multiplications and summations as described with respect to FIGURE 11. A group of amplifiers 225 generate inphase (+) outputs and out-of-phase (−) outputs which are applied through input resistor networks to non-inverting integrators 227. A cable 229 distributes the amplifier outputs to the appropriate integrator input resistors according to the labels on the leads connecting the resistors to the cable.

The following example of the operation of the "second-difference" operator circuit parallels the theoretical description with respect to FIG. 11 and pertains to the generation of V(1, −2). The third integrator shown in FIGURE 22*e* generates the sum V(1, −2). As described with respect to FIGURE 11, this sum is comprised of:

$$4D(1,-2)-D(1,-1)-D(0,-2)-D(2,-2)-D(1,-3)$$

The integrator input resistor network contains 5 resisors of appropriate relative ohmic values to perform this operation. In order to provide a weight of "4" to the D(1, 2) input (from the + output of amplifier 11), the resistor that is shown connected to amplifier "11+" has a relative ohmic value of 1, whereas the remainder of the resistances have relative ohmic values of 4. Thus, the integrator 227 in the "second-difference" operator circuit 11 provides the output V(1, −2), (which is equal to V(−1, 2) due to the symmetry of the autocorrelation function) by weighting and summing the appropriate autocorrelation function outputs.

Figure 22F:
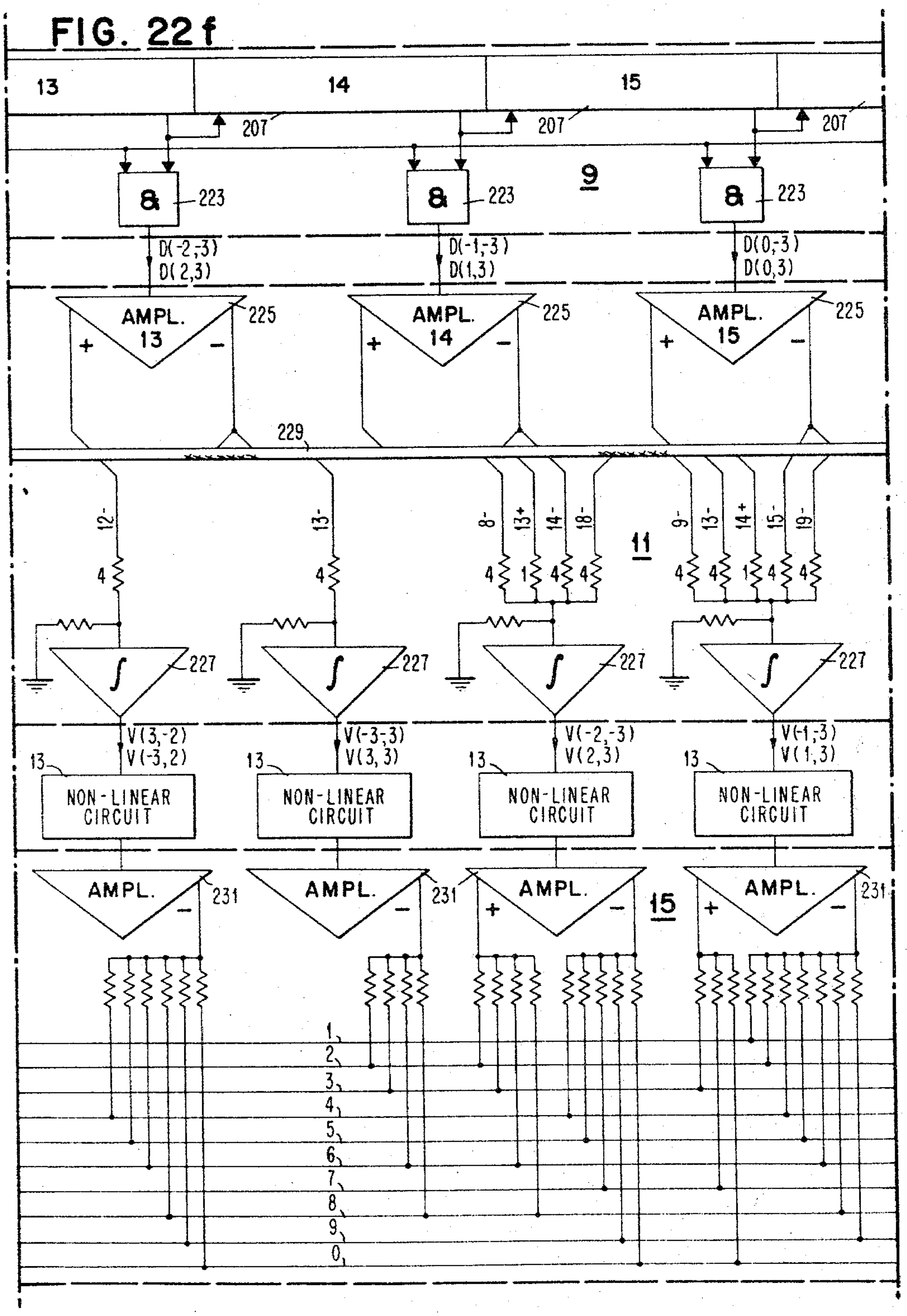
Figure 22G:
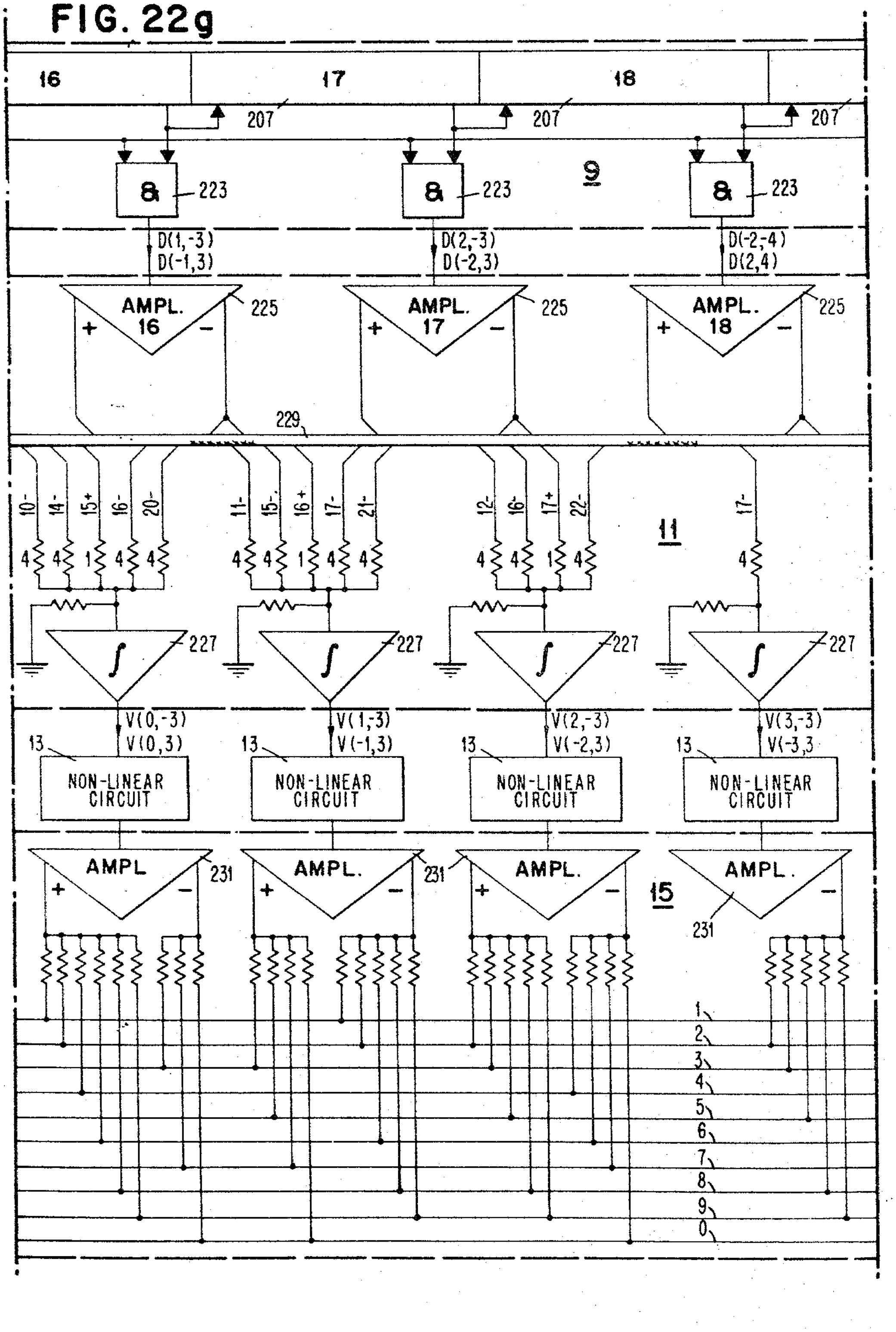
Figure 22H:
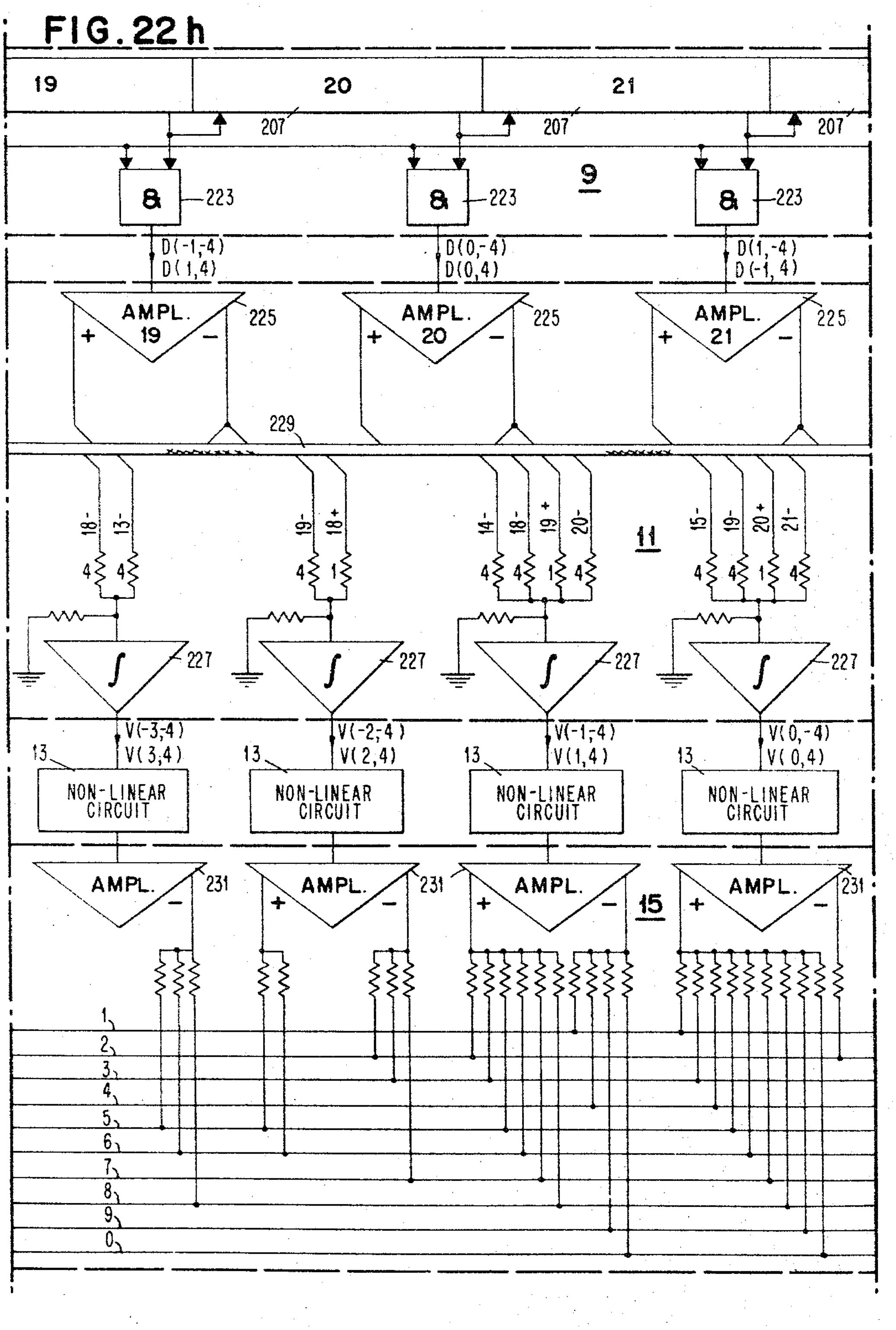
Figure 22I:
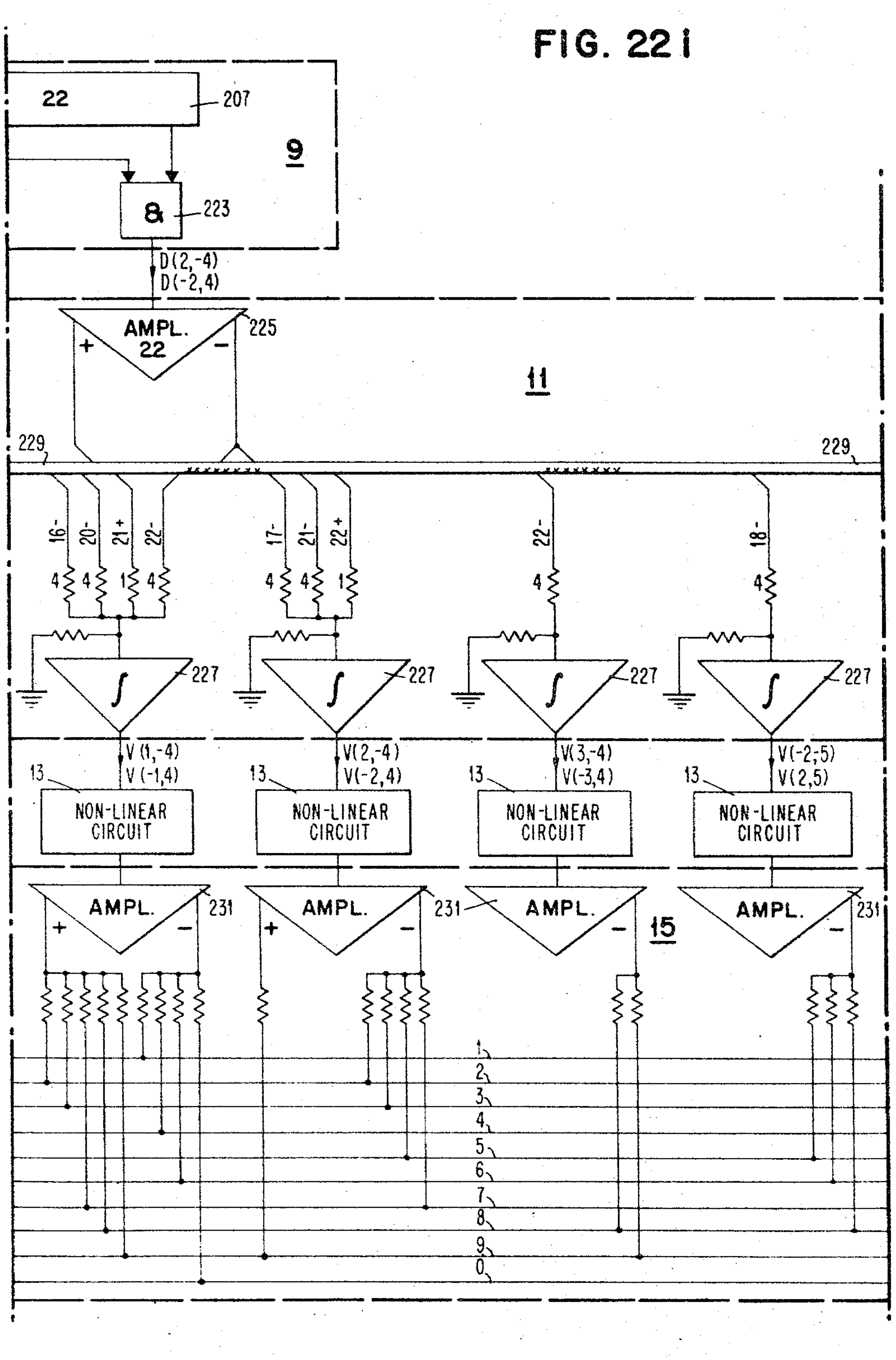
Figure 22J:
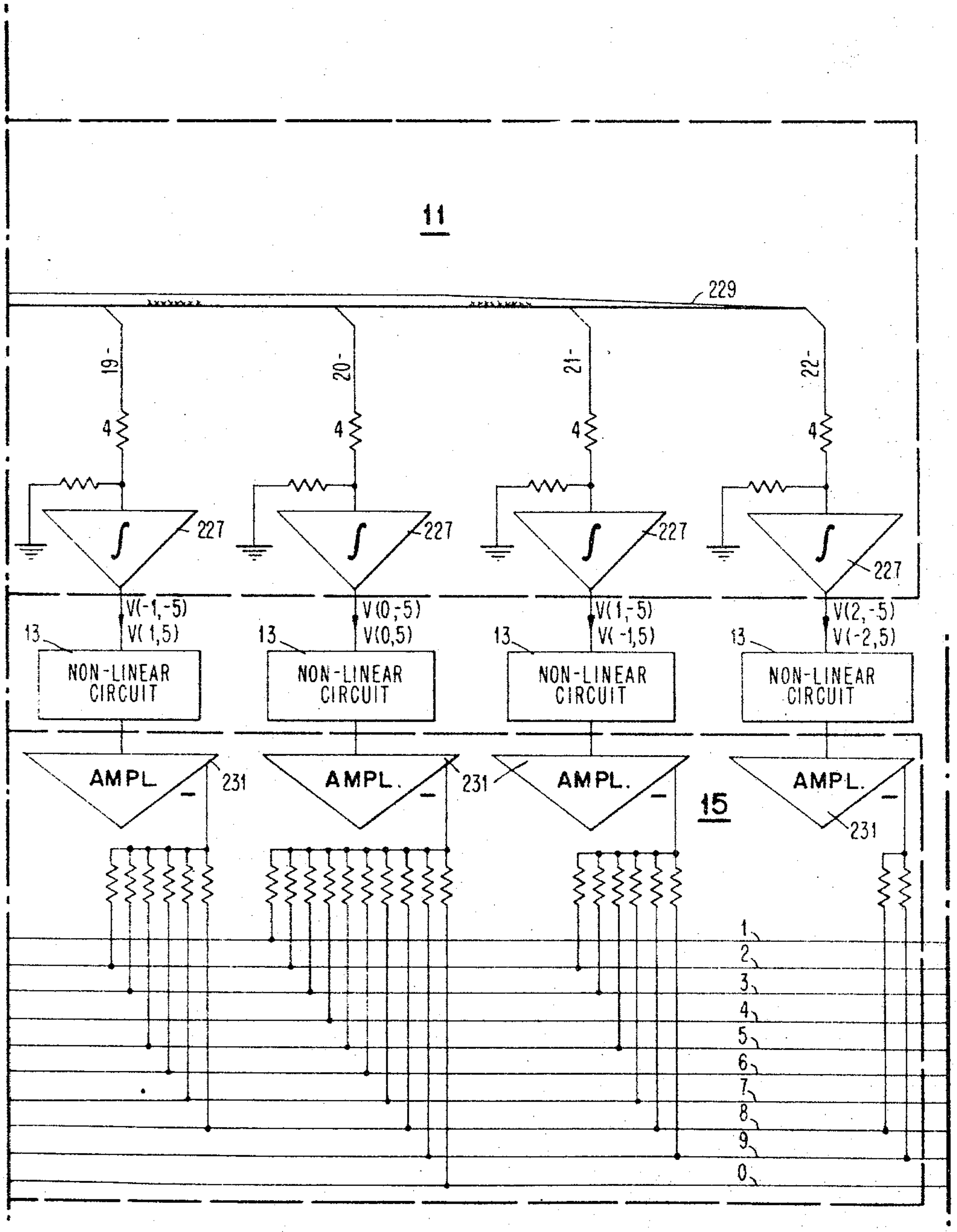
Figure 22K:
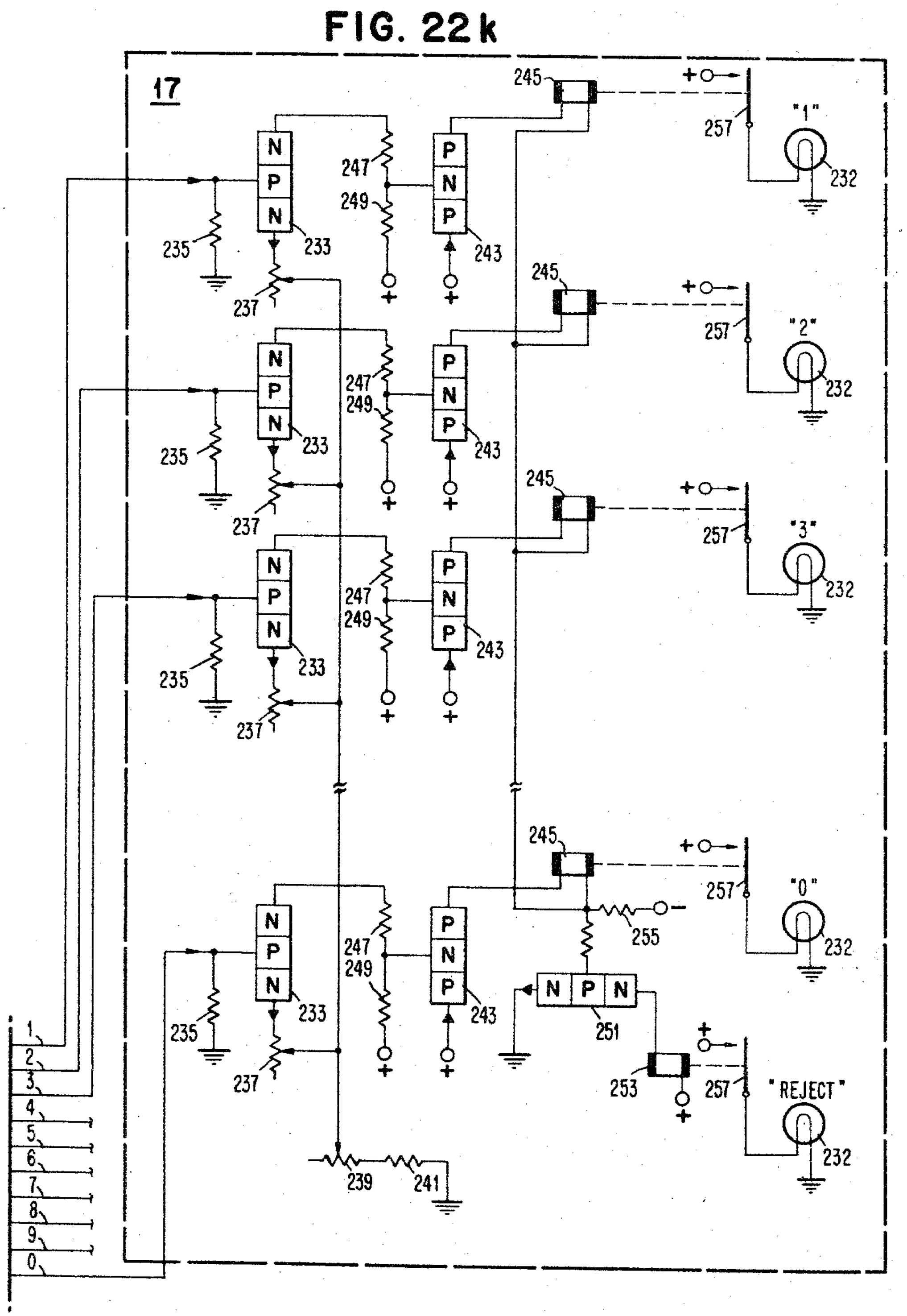

Several of the integrators have less than five inputs because the "second-difference" operator matrix, when centered one row or column outside of the autocorrelation function matrix (FIG. 11), provides less than five nontrivial products. For example, when generating V(3, −2) as shown in FIGURE 22*f*, the only product required is −1—D(2, −2).

The integrator which generates V( 0, 0), shown in FIGURE 22*a* has three inputs rather than five because the sum 4D(0, 0)—D(1, 0), —D(1, 0), —D(0, 1), —D(0, −1) includes two pairs of identical products: the pair D(1, 0) and D(−1, 0) and the pair D(0, 1) and D(0, −1). There pairs are identical due to the symmetry of the autocorrelation function. For this reason, the integrator input resistors that are connected to amplifiers "1—" and "5—" have relative ohmic values of 2 to double their relative weighting.

Two sums V(−3, −5), and V(3, −5), and their equivalents V(3, 5) and V(−3, 5) are not generated since they are always zero.

The analog output signals $V(x', y')$ of the integrators are applied to non-linear (threshold) circuits 13 of the type described with respect to FIG. 21. These circuits generate three-level (ternary) outputs $V^*(x', y')$ that represent +1, 0 or −1 as shown in the charts in FIG. 12.

A reference storage matrix 15 generates the function $S_{R,S}(x', y')$ which has been defined as:

$$\frac{\sum_{x',y'} V_S^*(x',y')V^*_R(x',y')}{\left[\sum_{x',y'} V_R^{*2}(x',y')\right]^{1/2}}$$

This circuit 15 contains a group of amplifiers 231 having in-phase outputs (labelled "+") and out-of-phase outputs (labelled "—") whose outputs are applied through resistors of relatively high ohmic value to minimize loading the amplifiers, to the appropriate horizontal output lines. The amplifier output resistors are all of equal ohmic value, except for the resistors connected to the V(0, 0) amplifier which have ohmic values equal to double the ohmic values of all other amplifier output resistors. Double-valued resistors are used to decrease the effect of the V(0, 0) amplifier output to one-half the effect of the other amplifier outputs. This compensates for the ungenerated reflected portion of all elements of the function $V_R^*(x', y')$ except for the (0, 0) element as described above with respect to FIGURE 12. The input to the amplifier represents $V_S^*(x', y')$ and the resistor connections are determined by $V_R^*(x', y')$ as shown in the charts in FIG. 12. The numerator summation is accomplished in the common summing resistors connecting the horizontal output lines to ground in FIGURE 22*a*. The denominator represents the normalization factors as calculated for the reference pattern. The relative ohmic values of these resistors are shown in FIGURE 22*a* to be the reciprocals of the normalization factors as shown in the charts in FIG. 12. The ohmic values of the resistors equal the reciprocals of the normalization factors, rather than the normalization factors themselves, because the voltage across the output resistor in a voltage divider is proportional to the ohmic value the resistor. Hence division is accomplished by the e of the resistor valves that are proportional to the recip-cals of the divisors. The ohmic values of these sum-ng resistors are relatively low to reduce cross-coupling tween the output channels. These resistor values as ell as the output connections from the amplifiers 231 e dependent upon the particular patterns which the stem is designed to identify. The method of determin-g the values shown in the charts in FIG. 12 has been scribed, and one skilled in the art could modify the nbodiment shown in FIGURE 22 to provide identifica-on of any specimens. The output connections of the nplifiers 231 are dependent upon the $V_R^*(x', y')$ charts FIG. 12. For example, the positive output of the third nplifier in FIG. 22 (representing $V_R^*(1, -2)$ and $_R^*(-1, 2)$ is connected to horizontal output leads "2," ," "6," and "0" and the negative output is connected leads "1," "3," "5" and "8." Leads "7" and "9" are ot connected to the amplifiers. Referring to the( 1, —2) osition of the $V_R^*(x', y')$ charts in FIG. 12, it is seen at a "1" occurs in the charts corresponding to "2," "4," ," and "0"; a "—1" occurs for "1," "3," "5" and "; and a "0" occurs for "7" and "9."

Since the positive output of the amplifiers 231 in FIG-RE 22*a*, representing $V_R^*$ (0.0), is connected to all hori-ontal output leads, it contributes nothing to the system scrimination and could be deleted.

A maximum signal indicator circuit 17, shown in FIG-RE 22*k* accepts the analog voltages present on the hori-ontal output leads and causes an output indicator lamp 32 to be lighted which is indicative of the identity of the ecimen. A reject indicator lamp is also provided and lighted if the largest input signal is not sufficiently eater than the second largest signal.

The input signals are applied to the base connections of group of NPN type transistors 233. Each transistor ase circuit includes a resistor 235 to protect the transis-or in the case of a disconnected input signal. The emit-r-base connection of the transistors provides a diode ction that, in conjunction with resistors 237, and a com-non path for current including resistors 239 and 241, per-nits current flow only to the transistor base to which the nost positive signal is applied. The voltage drop across esistors 239 and 241 back-biases the transistors 233 asso-iated with the less positive input signals, preventing cur-ent flow in their base circuits. The sensitivity of the cir-uit is defined as the amount that the most positive input ignal must exceed the adjacent signal (second most posi-ve signal) to back-bias the transistor associated with the atter signal. The sensitivity is controlled by the setting f resistor 239. Resistors 237 are adjusted to provide a onstant and equal emitter resistance for all of the tran-istors 233 regardless of the setting of resistor 239. As he common resistance in the emitter circuits is varied by change in the setting of resistor 239, the settings of esistors 237 are changed in the opposite direction to naintain a constant total emitter resistance. Resistors 237 may be controlled simultaneously with control of re-istor 239 by the use of a common control shaft. The ninimum common resistance in the emitter circuit is de-ermined by the fixed resistor 241. If the resistance of esistor 241 is labelled $R_{241}$, the active resistance of resis-or 239 is labelled $R_{239}$, the active resistance of resistor 237 is labelled $R_{237}$ and the emitter-base resistance of a ransistor 233 is labelled $R_{233}$, then the smallest ratio be-ween the amplitudes of the most positive signal $E_i$ and he adjacent signal $E_j$ that may be tolerated without indi-cating a reject is approximately:

$$\frac{R_{233}+R_{237}+R_{239}+R_{241}}{R_{239}+R_{241}}$$

Only the transistor associated with the most positive input signal is permitted to conduct if the most positive signal exceeds the adjacent signal by an amount greater than the sensitivity of the system.

The output of the conducting transistor 233 is applied to an associated PNP transistor switch 243 which, in turn, provides current to operate a relay 245 associated with the largest input signal. A group of resistors 247 provide protection for transistors 233 and 243. A sec-ond group of resistors 249 provide a path for leakage cur-rent in the base circuits of transistors 243.

A reject circuit containing a transistor 251 and the reject relay 253 operates when the largest two or more applied signals are approximately equal. This condition causes two or more relays 245 to operate. Transistor 32 is ordinarily non-conducting due to the negative volt-age at its base (which is equal to the supply voltage ap-plied to a resistor 255 less the voltage drop across the resistor). When two or more relays 245 are operated simultaneously, a sufficient current flows in resistor 255 to provide a voltage to the base of transistor 251 which is above its cut-off value and the transistor conducts, op-erating relay 253. Each relay has contacts 257 which control the operation of the indicator 232.

Specimen identification using comparison of non-linear functions of autocorrelation function has been shown and described with respect to an electronic embodiment. The particular non-linear function that is shown in the em-bodiment is a non-linearly weighted "second-difference" function.

The use of autocorrelation function comparison pro-vides registration invariance without the loss of stability. The "second-difference" function improves the system dis-crimination and when this function is modified by a non-linearly weighting of its elements, the system discrimina-tion is further enhanced.

While the invention has been particularly shown and described with reference to preferred embodiments there-of, it will be understood by those skilled in the art that the foregoing and other changes in form and details may be made therein without departing from the spirit and scope of the invention.

What is claimed is:

1. A specimen identification apparatus comprising, in combination: means for generating a non-linear function of an autocorrelation function of specimen data lo-cated throughout the specimen, and means for comparing said function with non-linear functions of autocorrela-tion functions of reference patterns, for identifying the specimen.

2. A specimen identification apparatus comprising, in combination: means for generating a non-linear function of a discriminating function of the autocorrelation func-tion of the specimen, and means for comparing said func-tion with non-linear functions of discriminating func-tions of autocorrelation functions of reference patterns for identifying the specimen.

3. A specimen identification apparatus comprising, in combination: means for generating a non-linear function of a "second-difference" function of the autocorrelation function of the specimen, and means for comparing said function with non-linear functions of "second-difference" functions of autocorrelation functions of reference pat-terns for identifying the specimen.

4. A specimen identification apparatus comprising, in combination: means for generating a non-linear function of the autocorrelation function of the specimen, and means for comparing said function with normalized non-linear functions of autocorrelation functions of reference patterns for identifying the specimen.

5. A specimen identification apparatus comprising, in combination: means for generating a non-linear func-tion of a discriminating function of the autocorrelation function of the specimen, and means for comparing said function with normalized non-linear functions of discrimi-nating functions of autocorrelation functions of reference patterns for identifying the specimen.

6. A specimen identification apparatus comprising, in combination: means for generating a non-linear function of a "second-difference" function of the autocorrelation function of the specimen, and means for comparing said function with normalized non-linear functions of "second-difference" functions of autocorrelation functions of reference patterns, for identifying the specimen.

7. A specimen identification apparatus comprising, in combination: electronic means for generating a non-linear function of an autocorrelation function of specimen data located throughout the specimen; and electronic means for comparing said function with non-linear functions of autocorrelation functions of reference patterns for identifying the specimen.

8. A specimen identification apparatus comprising, in combination: input means including a surface light scanning device and a light-sensitive device having an output $f(x,y)$ indicative of the specimen; means for generating a discriminating function $V_S(x',y')$ of the autocorrelation function $D_R(x',y')$ of the specimen indication $f(x,y)$; a non-linear operator responsive to the discriminating function $V_S(x',y')$ of the autocorrelation function of the speciment indication for generating a non-linear function $V_S{}^*(x',y')$ of the discriminating function; means for developing the sums $S_{S,R}$ for all reference patterns R, where $$S_{S,R}=\frac{\sum_{x',y'} V_S{}^*(x',y')\cdot V_R{}^*(x',y')}{\sum_{x',y'} V_R{}^{*2}(x',y')^{1/2}}$$

and where $V_R{}^*(x',y')$ is a non-linear function of a discriminating function $V_R(x',y')$ of the autocorrelation of a reference pattern R; and means for indicating the largest of said sums, which is indicative of the identity of the specimen.

9. A specimen identification apparatus comprising, in combination: input means including a surface light scanning device and a light-sensitive device having an output $f(x,y)$ indicative of the specimen, means for generating a "second-difference" function $V_S(x',y')$ of the autocorrelation function $D_R(x',y')$ of the specimen indication $f(x,y)$; a non-linear operator responsive to the "second-difference" function $V_S(x',y')$ of the autocorrelation function of the specimen indication for generating a non-linear function $V_S{}^*(x',y')$ of the "second-difference" function; means for developing the sums $S_{S,R}$ for all reference patterns R where, $$S_{S,R}=\frac{\sum_{x',y'} V_S{}^*(x',y')\cdot V_R{}^*(x',y')}{\left[\sum_{x',y'} V_R{}^{*2}(x',y')\right]^{1/2}}$$

and where $V_R{}^*(x',y')$ is a non-linear function of a "second-difference" function $V_R(x',y')$ is the autocorrelation function of a reference pattern R; and means for indicating the largest of said sums, which is indicative of the identity of the specimen.

10. A specimen identification apparatus, comprising, in combination: input means including a surface light scanning device and a light-sensitive device having an output $f(x,y)$ indicative of the specimen, means for generating an autocorrelation function $D_S(x',y')$ of the specimen indication $f(x,y)$; a non-linear operator responsive to the autocorrelation function $D_S(x',y')$ of the specimen for generating a non-linear function $D_S{}^*(x',y')$ of the autocorrelation function; means for developing the sums $S_{S,R}$ for all reference patterns R, where $$S_{S,R}=\frac{\sum_{x',y'} D_S{}^*(x',y')\cdot D_R{}^*(x',y')}{\left[\sum_{x',y'} D_R{}^{*2}(x',y')\right]^{1/2}}$$

and where $D_R{}^*(x',y')$ is a non-linear function of the autocorrelation function $D_R(x',y')$ of a reference pattern R; and means for providing an indication of the largest of the sums, which is an indication of the identity of the specimen.

11. A specimen identification apparatus comprising, in combination: input means including a surface light scanning device and a light sensitive device having an output $f(x,y)$ indicative of the specimen; means for generating an autocorrelation function $D_S(x',y')$ of the specimen indication $f(x,y)$; a non-linear operator responsive to the autocorrelation function $D_S(x',y')$ of the specimen for generating a non-linear function $D_S{}^*(x',y')$ of the autocorrelation function; means for developing the sums $S_{S,R}$ for all reference patterns R where.

$$S_{S,R}=\frac{\sum_{x',y'} D_S{}^*(x',y')\cdot D_R(x',y')}{\left[\sum_{x',y'} D_R{}^{*2}(x',y')\right]^{1/2}}$$

and where $D_R{}^*(x',y')$ is a non-linear function of the autocorrelation function $D_R(x',y')$ of a reference pattern R; and means for providing an indication of the largest of the sums, which is an indication of the identity of the specimen when the ratio of the largest and second largest sums exceeds a predetermined amount, and for providing a "reject" indication when the ratio is insufficient.

12. A specimen identification apparatus comprising, in combination: input means including a surface light scanning device and a light sensitive device having an output $f(x,y)$ indicative of the specimen, means for generating a discriminating function $V_S(x',y')$ of the autocorrelation function $D_S(x',y')$ of the specimen indication $f(x,y)$; a non-linear operator responsive to the discriminating function $V_S(x',y')$ of the autocorrelation function $D_S(x',y')$ of the specimen indication for generating a non-linear function $V_S{}^*(x',y')$ of the discriminating function; means for developing the sums $S_{S,R}$ for all reference patterns R, where $$S_{S,R}=\frac{\sum_{x',y'} V_S{}^*(x',y')\cdot V_R{}^*(x',y')}{\left[\sum_{x',y'} V_R{}^{*2}(x',y')\right]^{1/2}}$$

and where $V_R{}^*(x',y')$ is a non-linear function of a "second-difference" function $V_R(x',y')$ of the autocorrelation function $D_R(x',y')$ of a reference pattern R; and means for indicating the largest of said sums, which is indicative of the identity of the specimen when the ratio of the largest and second largest sums exceeds a predetermined amount, and for providing a "reject" indication when the ratio is insufficient.

13. A specimen identification apparatus comprising, in combination: timing means; input means responsive to said timing means, including a flying-spot scanner and a phototube, for scanning the specimen and providing an output signal $f(x,y)$ indicative of the specimen; a shift register responsive to the signal $f(x,y)$ and to the timing means, and having a plurality of output signals indicative of the specimen and differing from each other only in time; a plurality of two input coincidence means, each having one input connected to the signal $f(x,y)$ from the input means, and each having one input connected to one of said plurality of output signals from the shift register, for generating a plurality of signals $D_S(x',y')$ indicative of the autocorrelation function of the specimen; a "second-difference" operator circuit, comprising a plurality of integrators with input resistance networks, each responsive to at least one of the signals $D_S(x',y')$ for generating output signals $V_S(x',y')$ indicative of the "second-difference" function of the autocorrelation function of the specimen; a plurality of non-linear circuits, each responsive to one of said signals $V_S(x',y')$ for generating output signals $V_S{}^*(x',y')$ indicative of a non-linear function of the "second-difference" function of the autocorrelation function of the specimen; a reference storage resistor matrix responsive said signals $V_S^*(x',y')$ for generating normalized sums $_R$ for each reference R where:

$$S_{S,R}=\frac{\sum_{x',y'} V_S^*(x',y')\cdot V_R^*(x',y')}{\left[\sum_{x',y'} V_R^{*2}(x',y')\right]^{1/2}}$$

d where $V_R^*(x',y')$ represents a non-linear function the "second-difference" function of the autocorrela-n function of a reference pattern R; and maximum :nal indicating means responsive to the sums $S_{S,R}$ for oviding an indication of the largest of the sums, which indicative of the identity of the specimen when the tio of the largest and second largest sums exceeds a edetermined amount, and for providing a "reject" in-cation when the ratio is insufficient.

14. A specimen identification apparatus comprising, in mbination: timing means; input means responsive to id timing means, including a flying-spot scanner and phototube, for scanning the specimen and providing 1 output signal $f(x,y)$ indicative of the specimen; a ift register responsive to the signal $f(x,y)$ and to the ning means, and having a plurality of output signals dicative of the specimen and differing from each other ıly in time; a plurality of two input coincidence means, ich having one input connected to the signal $f(x,y)$ om the input means, and each having one input con-cted to one of said plurality of output signals from e shift register, for generating a plurality of signals $_S(x',y')$ indicative of the autocorrelation function of e specimen; a discriminating operator circuit, compris-g a plurality of integrators with input resistance net-orks, each responsive to at least one of the signals $_S(x',y')$ for generating output signals $V_S(x',y')$ in-icative of the discriminating function of the autocorrela-on function of the specimen; a plurality of non-linear rcuits, each responsive to one of said signals $V_S(x',y')$ or generating output signals $V_S^*(x',y')$ indicative of a on-linear function of the discriminating function of the utocorrelation function of the specimen; a reference orage resistor matrix responsive to said signals $_S^*(x',y')$ for generating normalized sums $S_{S,R}$ for each eference R where:

$$S_{S,R}=\frac{\sum_{x',y'} V_S^*(x',y')\cdot V_R^*(x',y')}{\left[\sum_{x',y'} V_R^{*2}(x',y')\right]^{1/2}}$$

nd where $V_R^*(x',y')$ represents a non-linear function f the discriminating function of the autocorrelation unction of a reference pattern R; and maximum signal ndicating means responsive to the sums $S_{S,R}$ for provid-ng an indication of the largest of the sums, which is ndicative of the identity of the specimen when the ratio f the largest and second largest sums exceeds a pre-letermined amount, and for providing a "reject" indi-ation when the ratio is insufficient.

15. An apparatus for identifying a specimen located n a document area, comprising in combination: means or generating a multi-valued representation of the docu-nent area, where each element of data corresponds to a predetermined location on the document and where he value of each element is determined by the relative intensity of the document at this location; means for analyzing the multi-valued data representation for data corresponding to pairs of predetermined data values at predetermined relative location throughout the document area, to generate a registration-invariant function of the specimen; means for generating a non-linear function of the generated registration-invariant function; and means for comparing the generated non-linear function to similar functions of reference patterns, to identify the specimen.

16. An apparatus for identifying a specimen located in a document area, comprising in combination: means for generating a binary data representation of the document area where each element of data corresponds to a predetermined location on the document, and where each element corresponding to a location within the specimen has a first binary value and where each element corresponding to a location outside of the specimen has a second binary value; means for analyzing the binary data representation for data corresponding to pairs of predetermined data values at predetermined relative locations throughout the document area, to generate a registration-invariant function of the specimen; means for generating a non-linear function of the generated registration-invariant function; and means for comparing the generated non-linear function to similar functions of reference patterns, to identify the specimen.

17. An apparatus for identifying a specimen located in a document area, comprising in combination: means for generating a multi-valued representation of the document area, where each element of data corresponds to a predetermined location on the document and where the value of each element is determined by the relative intensity of the document at this location; means for analyzing the multi-valued data representation for data corresponding to combinations of predetermined data values at predetermined relative locations throughout the document area, to generate a registration-invariant function of the specimen; means for generating a non-linear function of the generated registration-invariant function; and means for comparing the generated non-linear function to similar functions of reference patterns, to identify the specimen.

18. An apparatus for identifying a specimen located in a document area, comprising in combination: means for generating a binary data representation of the document area where each element of data corresponds to a predetermined location on the document, and where each element corresponding to a location within the specimen has a first binary value and where each element corresponding to a location outside of the specimen has a second binary value; means for analyzing the binary data representation for data corresponding to combinations of predetermined data values at predetermined relative locations throughout the document area, to generate a registration-invariant function of the specimen; means for generating a non-linear function of the generated registration-invariant function; and means for comparing the generated non-linear function to similar functions of reference patterns, to identify the specimen.

References Cited by the Examiner

UNITED STATES PATENTS

| | | | |
|---|---|---|---|
| 2,959,769 | 11/60 | Greanias. | |
| 2,968,789 | 1/61 | Weiss et al. | 235—61.11 |
| 2,978,675 | 4/61 | Highleyman | 235—61.11 |
| 2,985,298 | 1/61 | Schreiner | 340—149 |
| 3,008,123 | 11/61 | Rohland. | |
| 3,064,519 | 11/62. | Shelton. | |

OTHER REFERENCES

W. L. Bragg: "Lightning Calculation With Light," published by Nature 154, p. 69–72, July 15, 1944.

J. S. Bomba: "Alpha-Numeric Character Recognition Using Local Operations," Proceedings EJCC, December 1959, pp. 218–224.

L. A. Kamentsky: "Pattern and Character Recognition Systems-Picture Proceeding, by Nets of Neutron-Like Elements," Proceedings EJCC, March 1959, pp. 304–309.

MALCOLM A. MORRISON, *Primary Examiner.*

WALTER W. BURNS, JR., *Examiner.*